United States Patent [19]

Fuller, Jr. et al.

[11] Patent Number: 4,923,067
[45] Date of Patent: May 8, 1990

[54] AUTOMATED DRILL SORTING SYSTEM AND METHOD

[75] Inventors: Robert L. Fuller, Jr., Issaquah; Paul E. Faville; Mark C. Maier, both of Renton, all of Wash.

[73] Assignee: The Boeing Company, Seattle, Wash.

[21] Appl. No.: 270,129

[22] Filed: Nov. 10, 1988

[51] Int. Cl.⁵ .............................................. B07C 5/02
[52] U.S. Cl. ..................................... 209/539; 209/542; 209/555; 209/598; 209/912; 209/914
[58] Field of Search ............... 209/539, 540, 542, 544, 209/576, 587, 586, 589, 598, 557, 558, 655, 679, 677, 911, 912, 914, 933, 939, 555; 198/778, 395, 365, 532, 443, 741, 774; 221/173

[56] References Cited

U.S. PATENT DOCUMENTS

| | | | |
|---|---|---|---|
| 719,751 | 2/1903 | Condon | 104/75 |
| 1,090,948 | 3/1914 | Sklovsky et al. | 104/91 |
| 1,367,199 | 2/1921 | Miller | 209/605 |
| 1,466,029 | 8/1923 | Peters | 198/774 |
| 1,846,327 | 2/1932 | Gray | 209/626 |
| 2,186,652 | 1/1940 | Orth et al. | 209/642 |
| 2,464,449 | 3/1949 | Johnston | 209/625 |
| 2,794,551 | 6/1957 | Colling et al. | 209/676 |
| 2,873,854 | 2/1959 | Dapp et al. | 209/550 |
| 2,895,064 | 7/1959 | Hoff et al. | 310/29 |
| 2,982,405 | 5/1961 | Fitzgerald | 209/626 |
| 2,982,406 | 5/1961 | Fitzgerald | 209/626 |
| 2,984,350 | 5/1961 | Fitzgerald | 209/626 |
| 2,997,158 | 8/1961 | Moskowitz et al. | 198/220 |
| 3,052,999 | 9/1962 | Sedgwick et al. | 40/2.2 |
| 3,178,008 | 4/1965 | Solet | 198/778 |
| 3,197,027 | 7/1965 | Sargrove | 209/538 |
| 3,225,898 | 12/1965 | Roinestad | 198/181 |
| 3,225,902 | 12/1965 | Roinestad | 198/202 |
| 3,231,941 | 2/1966 | Flynn, Jr. | 19/106 |
| 3,261,451 | 7/1966 | Roinestad | 198/193 |
| 3,276,570 | 10/1966 | Hale et al. | 198/193 |
| 3,308,856 | 3/1967 | Ploss | 140/71 |
| 3,333,678 | 8/1967 | Rodman | 198/181 |
| 3,348,659 | 10/1967 | Roinestad | 198/136 |
| 3,366,248 | 1/1968 | Sedgwick et al. | 211/1.5 |
| 3,439,795 | 4/1969 | Roinestad et al. | 198/193 |
| 3,467,239 | 9/1969 | Roinestad | 198/195 |
| 3,528,136 | 9/1970 | Bechtel, Jr. et al. | 19/102 |
| 3,682,295 | 8/1972 | Roinestad | 198/203 |
| 3,716,128 | 2/1973 | Edge et al. | 198/38 |
| 3,727,690 | 7/1973 | Roinestad et al. | 198/193 |
| 3,737,953 | 6/1973 | Bechtel, Jr. | 19/113 |
| 3,793,677 | 2/1974 | Bechtel, Jr. | 19/113 |
| 3,794,155 | 2/1974 | Bechtel, Jr. | 198/194 |
| 3,812,965 | 5/1974 | Kurata et al. | 209/518 |
| 3,920,117 | 11/1975 | Roinestad | 198/194 |
| 4,074,392 | 2/1978 | Bechtel, Jr. | 19/113 |
| 4,078,655 | 3/1978 | Roinestad | 198/848 |
| 4,106,628 | 8/1978 | Warkentin et al. | 209/556 |
| 4,171,051 | 10/1979 | Wullenwaber | 209/542 |
| 4,249,661 | 2/1981 | Lem | 209/564 |
| 4,260,506 | 9/1981 | Roinestad | D12/60 |
| 4,383,604 | 5/1983 | Grandemange | 198/775 |
| 4,394,901 | 7/1983 | Roinestad | 198/850 |
| 4,398,318 | 8/1983 | Ashworth, III | 19/114 |
| 4,685,557 | 8/1987 | Roinestad | 198/834 |
| 4,688,678 | 8/1987 | Zue et al. | 209/552 |
| 4,741,430 | 5/1988 | Rolnestad | 198/778 |

FOREIGN PATENT DOCUMENTS

| | | | |
|---|---|---|---|
| 0056413 | 5/1981 | Japan | 198/395 |
| 0080887 | 9/1986 | Japan . | |
| 2184083 | 6/1987 | United Kingdom | 198/775 |

OTHER PUBLICATIONS

Ashworth Bros., Inc., "An Introduction to Small Radius Omniflex and Small Radius Omni-Grid", Bulletin No. SR80, (Rev. 8/83).

*Primary Examiner*—Donald T. Hajec
*Attorney, Agent, or Firm*—Delbert J. Barnard

[57] ABSTRACT

Drill bits (16) are delivered in a mixed, bulk form, in a random orientation, into an alignment unit (30). Aligned drill bits (16) move from the alignment conveyor (30) into the upper end of a singulator (36). Singulated drill bits (16) are delivered by the singulator (36) into a singulated drill bit conveyor (38, 49). Identifying means (202,236,240) identify each drill bit (16) as it travels and in conjunction with computers "A" and "B", cause a reversal of end-to-end orientation, if necessary, and movement of a deposit conveyor (52), and placement of each identified drill bit (16) into a dedicated receiving receptacle (54). The components of the system are arranged to take a small amount of floor space and provide good utilization of floor space.

17 Claims, 13 Drawing Sheets

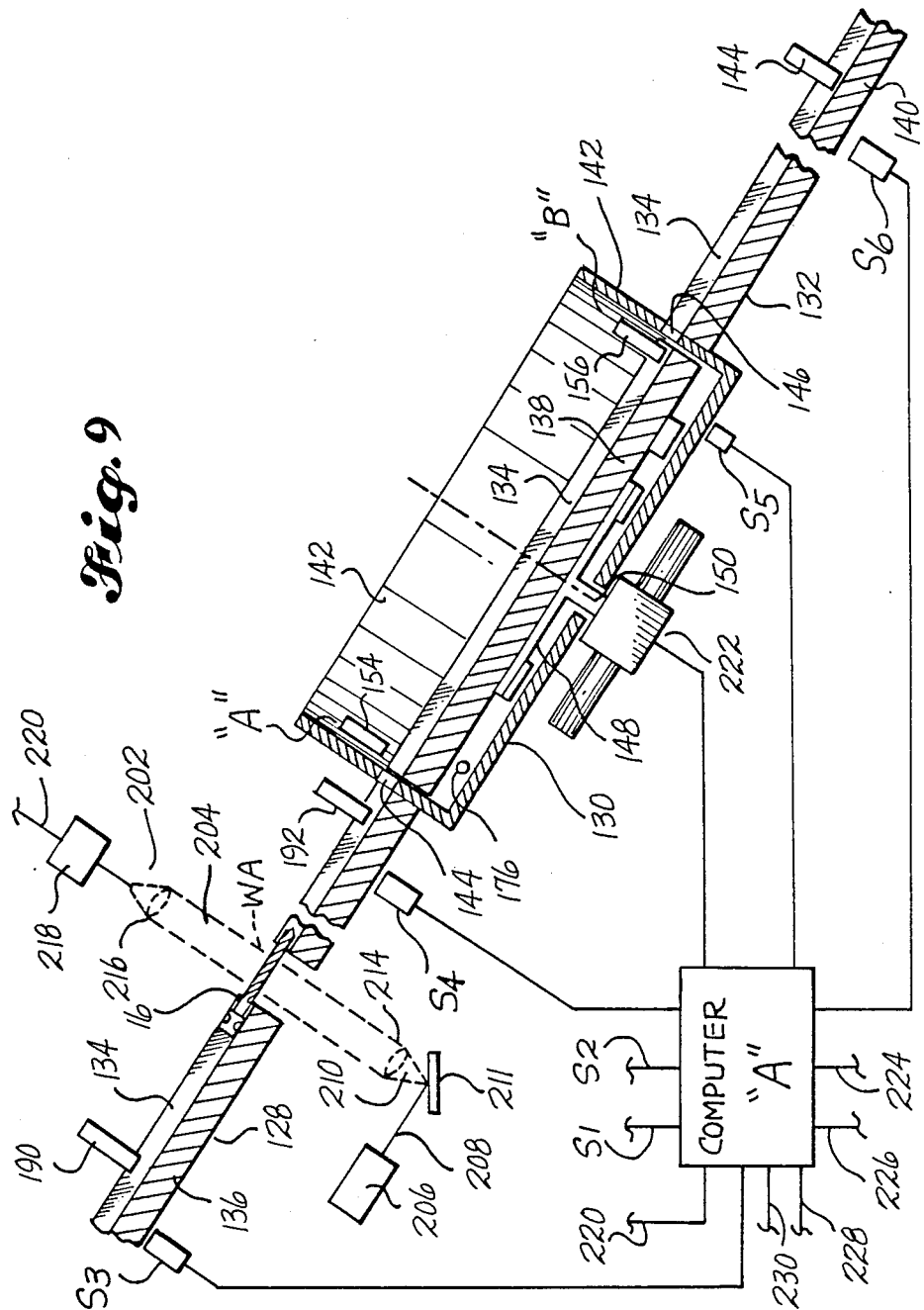

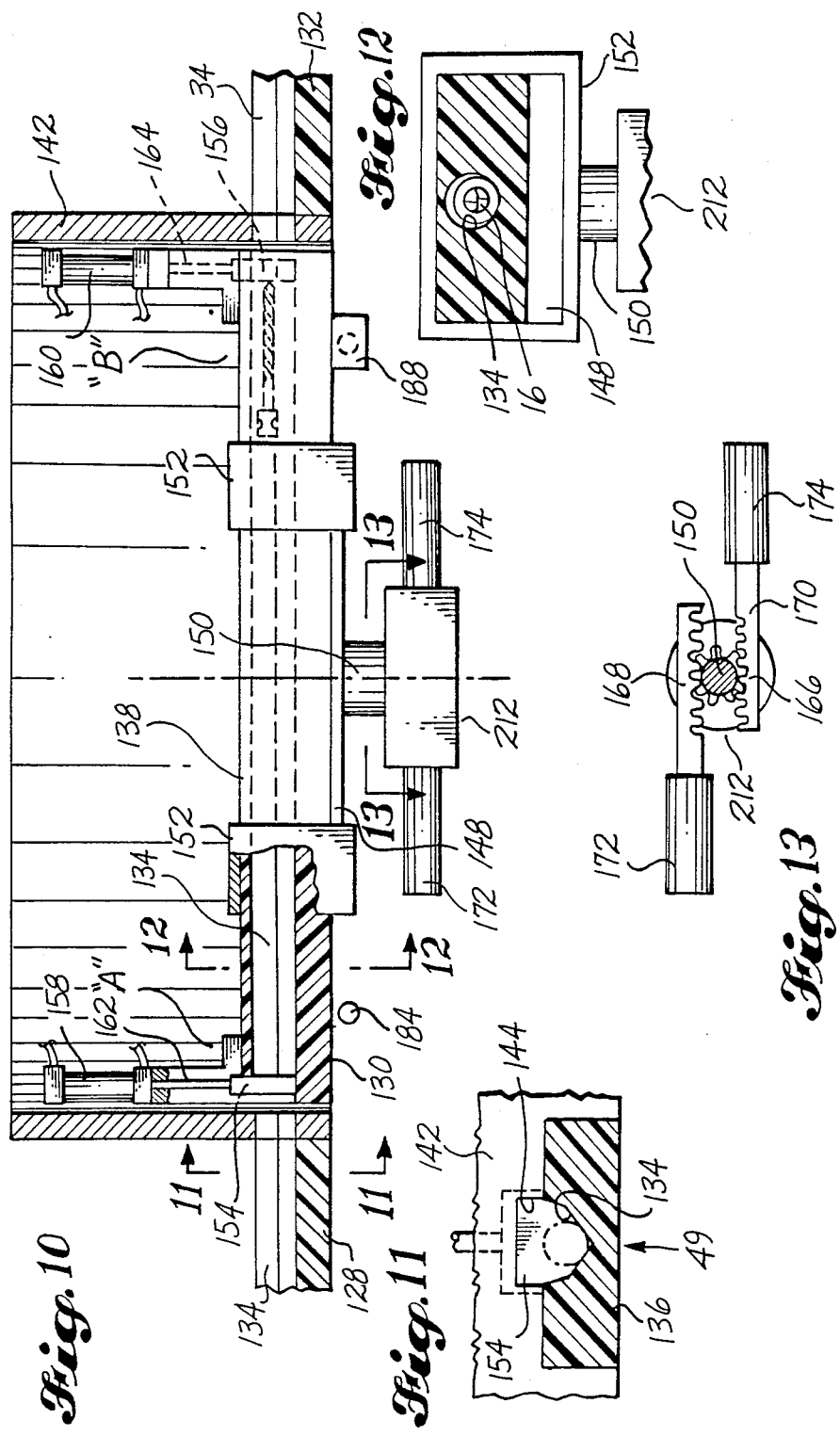

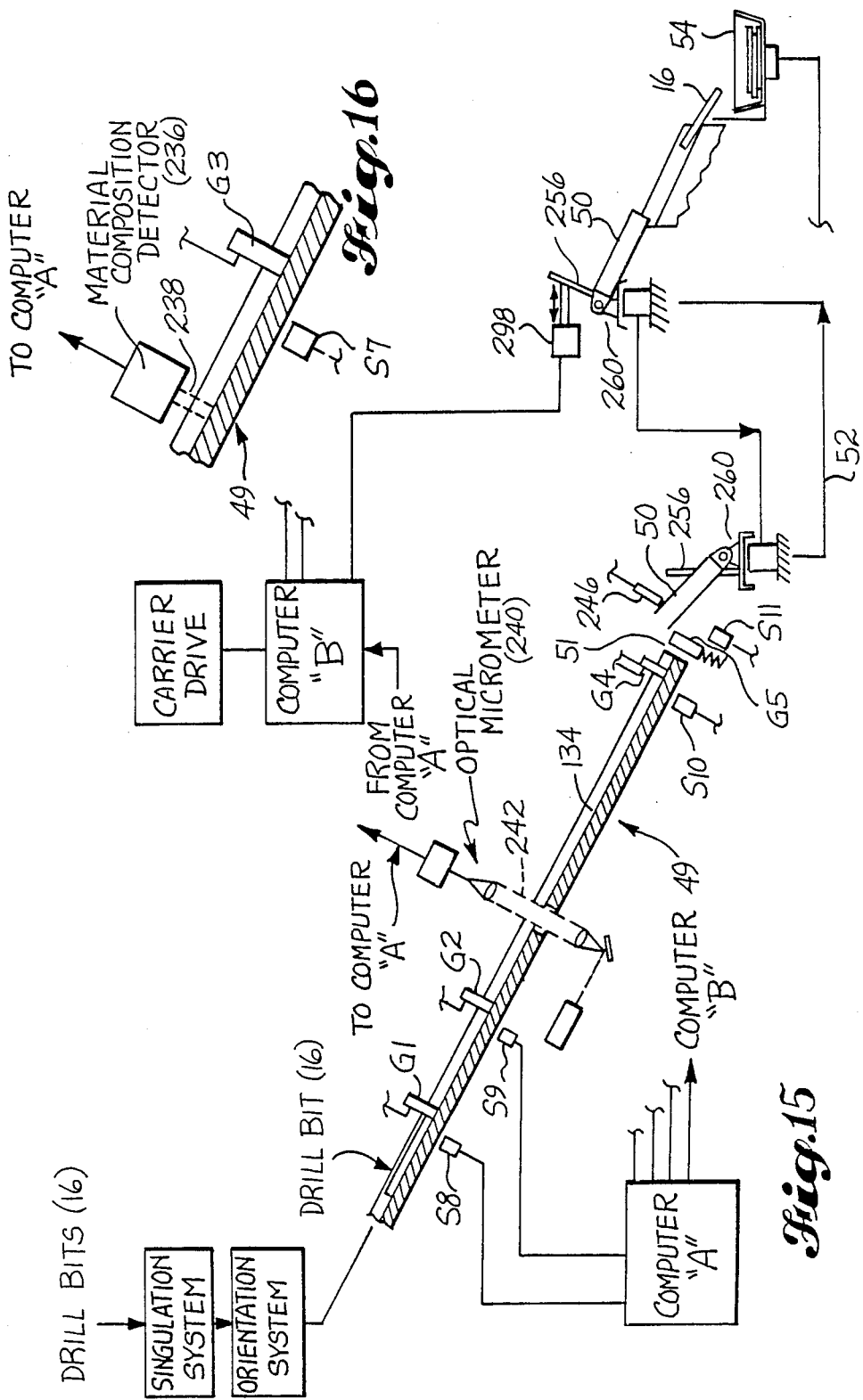

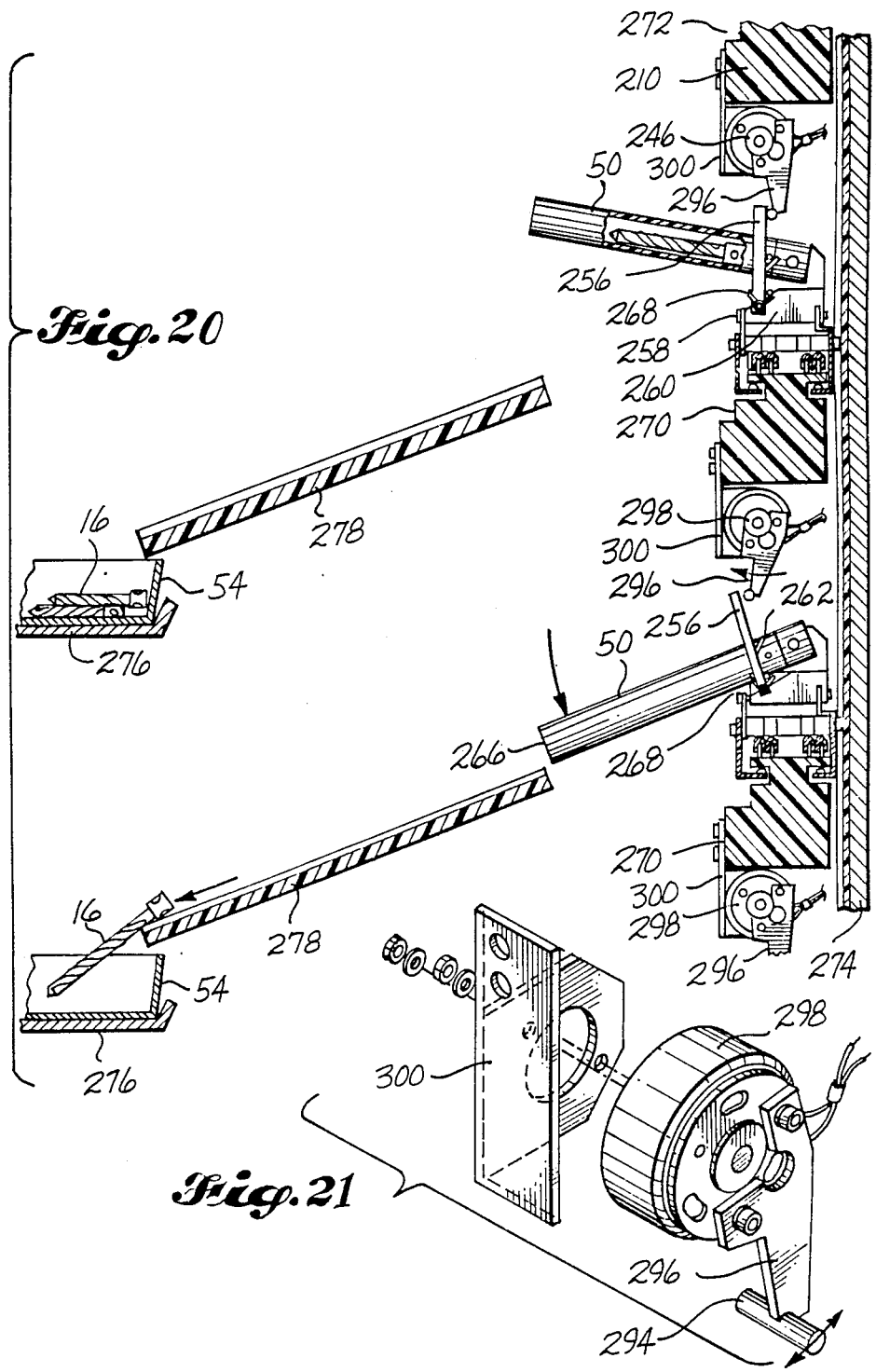

AUTOMATED DRILL SORTING SYSTEM AND METHOD

TECHNICAL FIELD

This invention relates to automated handling of drill bits. More particularly, it relates to a method and apparatus for receiving drill bits in a mixed, bulk form, piled on one another, in a random orientation, and then singulating them and moving them on to a conveyor, one at a time, and spaced apart single file, then identifying the drill bits as to size and/or type while they are moving, and then conveying each drill bit to a dedicated receiving receptacle.

BACKGROUND OF THE INVENTION

Many manufacturing operations (e.g. the manufacture of aircraft) require the drilling of a large number of holes in varying sizes. Drill bits are used until they become dull and then they are resharpened. In a typical aircraft manufacturing plant, it is necessary to resharpen an extremely large number of drill bits each week. By way of example, approximately 50,000 used drill bits are resharpened each week by The Boeing Company in a facility in Auburn, Wash.

The used drill bits are cleaned and sorted before being resharpened. In the past, the sorting operation has been a manual process requiring a number of people (e.g. eight) to perform rough sorting and final sorting activities. In the manual process, cleaned drill bits are deposited onto a conveyor which moves them past two or three people who manually remove the drill bits from the conveyor and separate them into rough sort categories (e.g. 20-25 categories). The drill bits are then hand carried to final sort areas where additional personnel (e.g. five to six people) manually identify and place the drill bits into species bins. In the aforementioned Auburn facility of The Boeing Company, the drill bits to be sorted comprise over six hundred types.

A principal object of the present invention is to provide a method and apparatus for receiving large quantities of a large number of sizes and types of drill bits, in an initial entangled mix, and then automatically separating them and conveying each to a dedicated receiving receptacle.

RELATED APPLICATIONS

The present invention utilizes systems and components which are specifically disclosed but more generally claimed, in the following copending applications: Ser. No. 07/270,221, filed Nov. 10, 1988, entitled "Article Sorting Apparatus and Method"; Ser. No. 07/270,130, filed Nov. 10, 1988, and entitled "Article Singulating System and Method"; Ser. No. 07/269,991, filed Nov. 10, 1988, and entitled "Storage Mechanism for Sorted Articles"; Ser. No. 07/270,251, filed Nov. 10, 1988, and entitled "Article Orientation System and Method"; and Ser. No. 07/316,171, filed Feb. 24, 1989, and entitled "Material Composition Analyzer and Method". The disclosures of each of these applications is hereby incorporated herein by this specific reference.

DISCLOSURE OF THE INVENTION

The method aspect of the invention is basically characterized by the steps of receiving large quantities of many different sizes and/or types of drill bits, in a mixed, bulk form, piled on one another in a random orientation; then delivering said drill bits into an alignment conveyor having a bottom which includes a plurality of elongated, parallel, alignment channels, into which the drill bits migrate as they are conveyed by the alignment conveyor; then delivering aligned drill bits from the alignment conveyor into an upper portion of a singulator; then moving the aligned drill bits laterally, along the singulator, and as they are moving, separating them, each from the rest; then delivering singulated drill bits, one at a time, from the singulator onto the upper run of a conveyor belt, each spaced apart from the drill bit preceding it; then moving the conveyor belt to carry the drill bits to the upper end of a gravity conveyor, and delivering them in succession, into a longitudinal slideway which extends along the gravity conveyor; then moving the drill bits in succession along the slideway, through an identifying means which produces an identification signal for each drill bit, as to its size and/or type; then moving the identified drill bits one at a time to a loading station; then at the loading station, successively delivering the identified drill bits, each into a separate drill bit carrier that is a part of an endless conveyor; then moving the endless conveyor along a path which borders a succession of dedicated receiving receptacles for the drill bits, each said receiving receptacle being provided to receive and store a particular size and/or type of drill bit; and then, by use of a computer, and stored information in the computer, and the identification signals generated for the drill bits, removing each drill bit from its carrier and depositing it into its dedicated receiving receptacle in response to movement of the carrier from said loading station to a discharge position adjacent the dedicated receiving receptacle.

In preferred form, the drill bits, while on the gravity conveyor, are also moved successively through a second identifying means which identifies the particular end-to-end orientation of each drill bit, as it is moving, and produces a signal indicating the particular end-to-end orientation; then moving the drill bit into a rotatable section of the gravity conveyor; then continuing movement through the gravity conveyor of any drill bit having a desired end-to-end orientation; and in response to a drill bit having an improper end-to-end orientation being delivered into the rotatable section, rotating the rotatable section 180°, to reverse the end-to-end orientation of the drill bit, and then continuing movement of the drill bit along the gravity conveyor.

Also in preferred form, the initial mix of drill bits is delivered into a vibrating conveyor and the vibrating conveyor is operated to at least partially disentangle the drill bits, and thin out and scatter the pile, while conveying them forwardly. The vibrating conveyor may deposit the drill bits onto an advancing conveyor which carries them through a demagnetizer and then into the alignment conveyor.

In preferred form, the dedicated receiving receptacles are positioned in a helical pattern developed about a vertical axis. The drill bits are delivered to the receptacles by an endless conveyor which travels an endless path bordering the receptacles. A computer, acting in response to the identification signal for each drill bit, and stored information, controles each drill bit carrier and in response to such carrier moving into a position adjacent the dedicated receiving receptacle for its drill bit, causes the carrier to deposit its drill bit into such receiving receptacle.

According to an aspect of the invention, the system components are designed to take up only a relatively small amount of floor space. The infeed conveyor delivers the drill bit mix into the vibrating conveyor which is positioned at one corner of the work area. The vibrating conveyor, the advancing conveyor and demagnetizer are preferably aligned along one end of the work area. They deliver the drill bits into an end of the alignment conveyor. The alignment conveyor extends inwardly of the area, along a path perpendicular to the vibrating conveyor and the advancing conveyor. The alignment conveyor discharges the drill bits onto the upper end of the singulator. The singulator extends perpendicular to the alignment conveyor, in a direction parallel to the advancing conveyor. Drill bits which have been properly singulated are deposited by it onto the lower end of an elevating conveyor. The elevating conveyor extends parallel to the alignment conveyor, further inwardly of the working area. Drill bits which are not properly processed in the singulator are discharged into the lower end of a return conveyor. The return conveyor also extends parallel to the alignment conveyor, but in a direction opposite the elevating conveyor. It elevates the drill bits which are received by it and deposits them into a feed chute extending back to the receiving end of the alignment conveyor. This receiving chute is substantially in position with the alignment conveyor and the advancing conveyor. The elevating conveyor is in straight line alignment with the gravity conveyor. The lower end of the gravity conveyor is at a loading station, whereat the drill bits are loaded into carrier tubes which are carried by the endless conveyor. This loading occurs at an upper run of the endless conveyor which extends perpendicular to the gravity conveyor, inwardly of the work area. The upper run of the endless conveyor makes a tangential entry to the lower end of the helical path of the conveyor. At the top of the helical path, the endless conveyor makes a tangential exit and then extends vertically downwardly, and then horizontally back towards the loading station, as a lower run. The receiving receptacles are positioned in a helical pattern which is spaced radially outwardly from the helical path of the endless conveyor. A delivery ramp is positioned radially between the helical path of the endless conveyor and the receiving receptacles. This ramp extends along a helical path and slopes downwardly as it extends radially outwardly, and includes guiding channels for the drill bits.

The arrangement of the system, starting with the discharge end of the infeed conveyor and ending with the receiving receptacles and their support structure defines an interior space. This space is bounded at one end by the discharge end of the infeed conveyor, the vibrating conveyor, the advancing conveyor, and the return chute, and at the opposite end by the endless conveyor and the receiving receptacles and their support structure, and is bounded at one side by the separating conveyor, the singulator, the elevating conveyor and the gravity conveyor. The computers "A" and "B", desk space, storage cabinets, etc. can be conveniently placed within the interior area.

The components starting with the vibrating conveyor and extending to the receiving end of the elevating conveyor can all be supported on the floor and for the most part, the operator's access to these components can be achieved by the operator standing on the floor. The construction and arrangement of the system makes it convenient to incorporate the elevating conveyor and the gravity conveyor into a support structure which is made to include a first stairway adjacent an intermediate portion of the elevating conveyor, a second stairway adjacent an intermediate portion of the gravity conveyor, and an elevated landing adjacent the upper ends of elevating conveyor and the gravity conveyor. The elevated landing and stairways are preferably on the inward (of the work area) side of the elevating and gravity conveyors. An elevated walkway may also be conveniently provided around the helical pattern of receiving receptacles, with a stairway being provided to communicate such walkway with the floor.

These and other objects, features and advantages of the invention are hereinafter described in further detail in connection with the illustrated embodiment.

BRIEF DESCRIPTION OF THE DRAWINGS

Like reference numerals or letters are used to designate like parts throughout several views of the drawings, and:

FIG. 9 is a simplified schematic diagram of a mechanism which is incorporated into the gravity conveyor and functions to reverse the end-to-end orientation of drill bits that are delivered to it point end first;

FIG. 10 is a longitudinal sectional view of a rotatable conveyor section, with some parts shown in elevation, such view showing the two ends "A" and "B" of the rotatable section in the same orientation as they appear in FIG. 9;

FIG. 11 is a cross-sectional view taken substantially along line 11—11 of FIG. 10;

FIG. 12 is a cross-sectional view taken substantially along line 12—12 of FIG. 10;

FIG. 13 is a cross-sectional view taken substantially along line 13—13 of FIG. 10;

FIG. 15 is a schematic diagram of the slideway in its extent between the orientation system shown by FIG. 9 to the loading station, and including a schematic diagram of the endless conveyor portion of the system, such view showing a drill bit to be sorted positioned at a ready gate;

FIG. 16 is a fragmentary schematic view of an apparatus for detecting the presence or absence of a particular chemical element in a drill bit, to produce an identification signal based on material content;

FIG. 20 is a fragmentary side elevational view, with some parts in section, showing portions of the helical track for the endless conveyor, and showing a carrier tube being tipped in position for the purpose of depositing its drill bit onto the ramp and showing the drill bit sliding along the ramp into its receiving receptacle; and FIG. 21 is an enlarged scale isometric view of an operator for operating the carrier tube release mechanism.

BEST MODE FOR CARRYING OUT THE INVENTION

The illustrated embodiment is a system for sorting used drill bits prior to their being sharpened.

Figure 1:
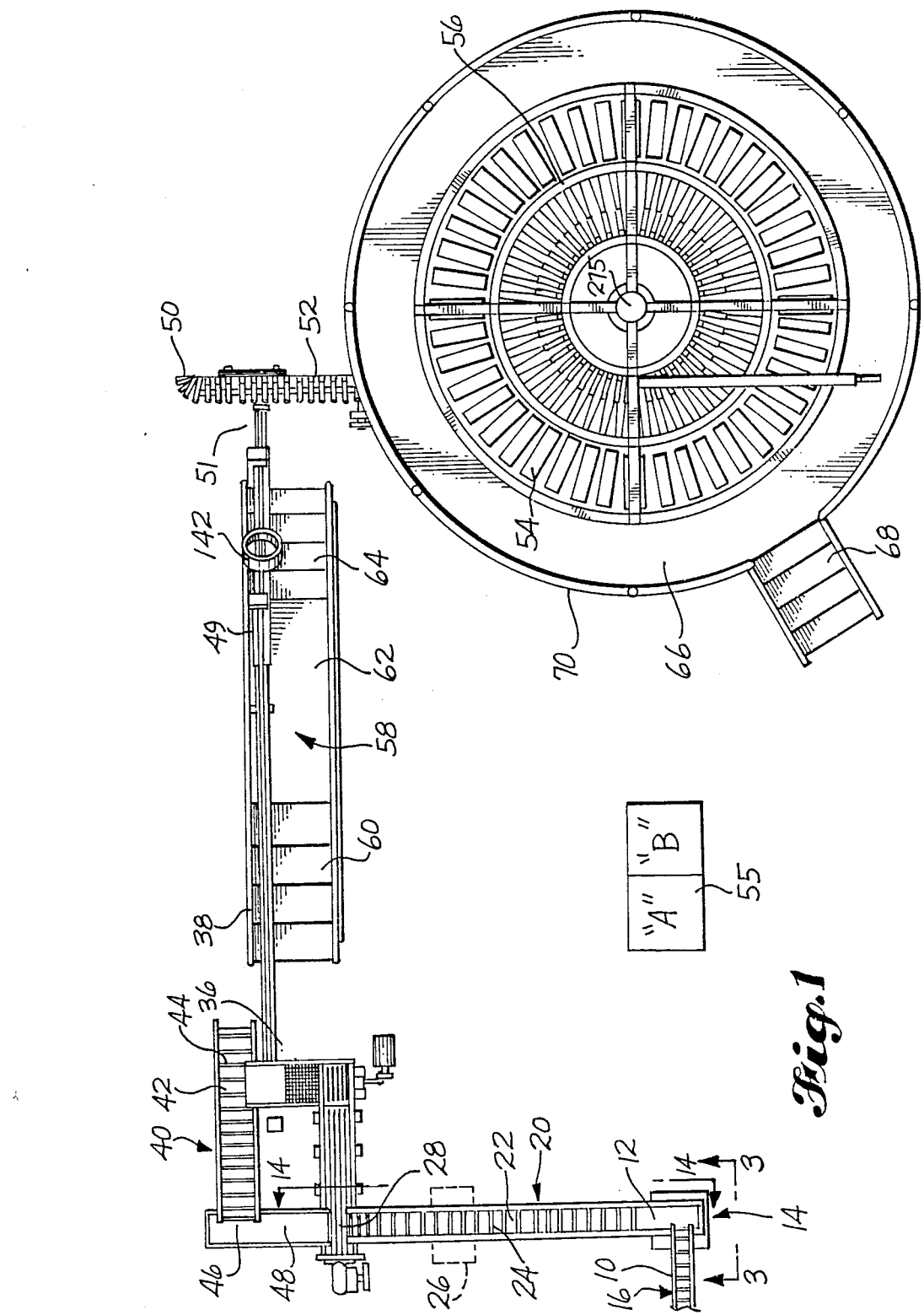
FIG. 1 is a top plan view of a drill bit sorting system embodying the invention, such view serving as a flow diagram and showing an advantageous positioning of the several components of the system relative to each other.

Referring to FIG. 1, drill bits which need to be resharpened are delivered by an endless belt conveyor 10 into a receiving pan portion 12 of a vibrating conveyor 14. The drill bits 16 are stacked several inches thick on the upper run of the conveyor 10 and they are matted together, i.e. entangled. The upper boundary of the mat of drill bits 16 is designated 18 in FIGS. 3 and 4. The vibrating conveyor 14 helps shake the drill bits 16 apart. Also, the pan 12 of the vibrating conveyor 14 absorbs the fall of the drill bits 16. The vibrating conveyor 14 moves the drill bits 16 onto the upper run of an endless conveyor belt 20, sometimes hereinafter referred to as the "advancing" conveyor 20. The belt of conveyor 20 could be damaged (or its wear accelerated) if drill bits 16 were to be dropped directly onto it by the infeed conveyor 10.

By way of typical and therefore nonlimited example, the vibrating conveyor 14 may be of a type manufactured by Eriez Manufacturing Co., a corporation of Penn. Such a conveyor is disclosed in now expired U.S. Pat. No. 2,997,158, granted Aug. 22, 1961, to Lester R. Moskowitz and Robert R. Peterson.

Figure 3:
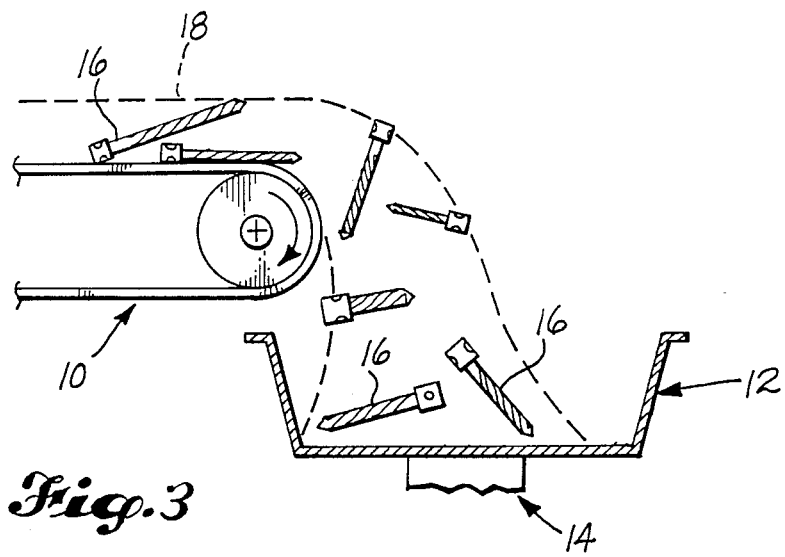
FIG. 3 is an enlarged scale sectional view, diagramatic in form, taken from the aspect of line 3—3 in FIG. 1.

Referring to FIG. 3, the drill bit mat 18 is shown to be thinning out as drill bits 16 from it are delivered by the vibrating conveyor pan 12 onto the upper run of endless belt conveyor 20. Endless belt conveyor 20 may comprise a rubber or rubber-like conveyor belt 22, of known construction, or a type including transverse cleats 24 molded into its upper surface.

Conveyor 20 first moves the drill bits through a demagnetizer 26 which is only shown schematically because it is a known item. For example, a suitable demagnetizer 26 is manufactured by Electromatic, a company located in Chicago, Ill.

The drill bits 16, after being moved through the demagnetizer 26, are delivered by conveyor 20 into the hopper portion 28 of an alignment conveyor or orientor 30. The orientor 30 has two purposes. Firstly, it orients all of the drill bits 16 delivered to it into a position of longitudinal alignment with a set of parallel gauge openings 32, and moves the drill bits 16 into the gauge openings 32. Secondly, it separates out oversized drill bits and other types of oversized articles 160S which might have been mixed in with the drill bits 16.

Referring again to FIG. 1, an advantageous utilization of floor space is to place the emptied conveyor 10 so that it extends perpendicular to both vibrating conveyor 14 and the advancing conveyor 20. The demagnetizer 26 is positioned intermediate the ends of the conveyor 20 and includes a tunnel-like passageway through which the upper run of the conveyor 20 extends. The orientor 30 is positioned to extend perpendicular to conveyor 20. As will hereinafter be described, orientor 30 feeds the drill bits 16 into a collector 34 which is positioned below the gauge openings 32. The collector 34 is adapted to periodically deposit a collected quantity of the drill bits 16 onto a singulator 36. The singulator 36 is directed substantially perpendicular to the orientor 30. It has two separate discharge paths. The first discharge path leads onto an elevating conveyor 38. The drill bits 16 which are deposited onto the elevating conveyor 38 are the drill bits 16 which have been successfully separated from the rest by the singulator 36. These drill bits 16 are delivered one at a time, in single file, onto the upper run of the elevating conveyor 38. The conveyor 38 extends perpendicular to the longitudinal axis of the singulator 36. The second discharge path for drill bits 16 from the singulator 36 is straight off of the second end of the singulator 36. Drill bits 16 which travel this path are drill bits 16 which for some reason or another do not become properly positioned on the singulator 36. The singulator 36 is constructed in a manner which causes these drill bits 16 to slide lengthwise along the singulator 16 and onto the upper run of a return conveyor 40. The return conveyor 40 preferably has a rubber or rubber-like belt 42 and tranverse cleats 44 molded into the belt 42. Conveyor 40 elevates the drill bits 16' which it receives and deposits them into a hopper 46 having a bottom portion 48 sloped so as to deliver the drill bits 16' back into the hopper 28 of the orientor 30. Return conveyor 40 extends substantially perpendicular to the singulator 36. Hopper 46 extends substantially perpendicular to the return conveyor 40.

The elevating conveyor 38 discharges the drill bits 16 onto a gravity conveyor 49 which may be both a part of an orientation system and an identification system. The gravity conveyor delivers the drill bits 16 to a loading station 51. At the loading station, the drill bits 16, which at this time have been identified as to species, are individually delivered into carrier tubes 50 which are part of an endless conveyor 52 which delivers each drill bit 16 to an associated receiving receptacle 54. In the illustrated system, the endless conveyor 52 moves the carrier tubes 50 along a helical path which may, by way of example, be ten turns in height. The receiving receptacles 54 are positioned in a helical pattern outwardly adjacent the conveyor path. The system is operated in part by computer 55. A part "A" of the computer 55 may control the delivery of the drill bits 16 through the identification system. The second part "B" of the computer 55 may control movement of the conveyor 52 and the transfer of the drill bits 16 from the carrier tubes 50 to the appropriate receiving receptacles 54. Each drill bit 16 is identified as to species immediately before it is deposited into a carrier tube 50. The identification information is used by the computer 55 to effect a transfer of the identified drill bit 16 out from its carrier tube 50 and into its receiving receptacle 54. The identification information, and other information stored in the computer 55, tells the computer 55 how many positions a particular carrier unit 50 is from the particular receiving receptacle 54 that is to receive the particular drill bit that is in such carrier unit 50. When this carrier unit 50 moves the number of positions required to place it laterally adjacent the proper receiving receptacle 54, the computer 55 activates a mechanism which transfers the drill bit 16 from its carrier unit 50 into its receiving receptacle 54.

As shown in FIG. 1, the framework for the elevating conveyor 38 and the gravity conveyor 49, and the associated identification equipment, may advantageously include a walkway 58. A walkway 58 may comprise steps 60 at one end, an elevated platform 62 in its midsection, and steps 64 at its second end. This arrangement allows operators and maintenance personnel to walk alongside the system, in its extent between the singulator 36 and the loading station 51. The framework 56 which establishes the helical path of travel for the endless conveyor 52, and which supports the collection receptacles 54 and the mechanism used for transferring drill bits from the carrier units 50 to the collection receptacles 54, preferably also defines an elevated walkway 66 which surrounds the receiving receptacles 54. A stairway 68 may be provided for use by operators and maintenance personnel. As shown by FIG. 1, the endless conveyor 52 includes a path that is perpendicular to the gravity conveyor 49, and the other components of the system which are substantially in alignment with gravity conveyor 49. The upper run of this path of the endless conveyor 52 enters the helical portion of the path at a tangent to it, at the bottom of such helical path. It then moves upwardly as it traverses the turns of the helical path. At the top of the helical path, it extends outwardly at a tangent, substantially in line with, but spaced above, the straight line path leading into the helical path. It then turns and extends vertically downwardly and then turns again and makes a return run horizontally over to the vicinity of the loading station 51. As shown by FIG. 1, this orientation of the endless conveyor 52, and its relationship to the other components of the system, provides a very efficient utilization of floor space. The computer 55, some control consoles (not shown), desks for the operators, etc. may be conveniently positioned in the space that lies on the side of the walkway 58 which is between the conveyor 20 and the collection and holding mechanism 70.

Figure 2:
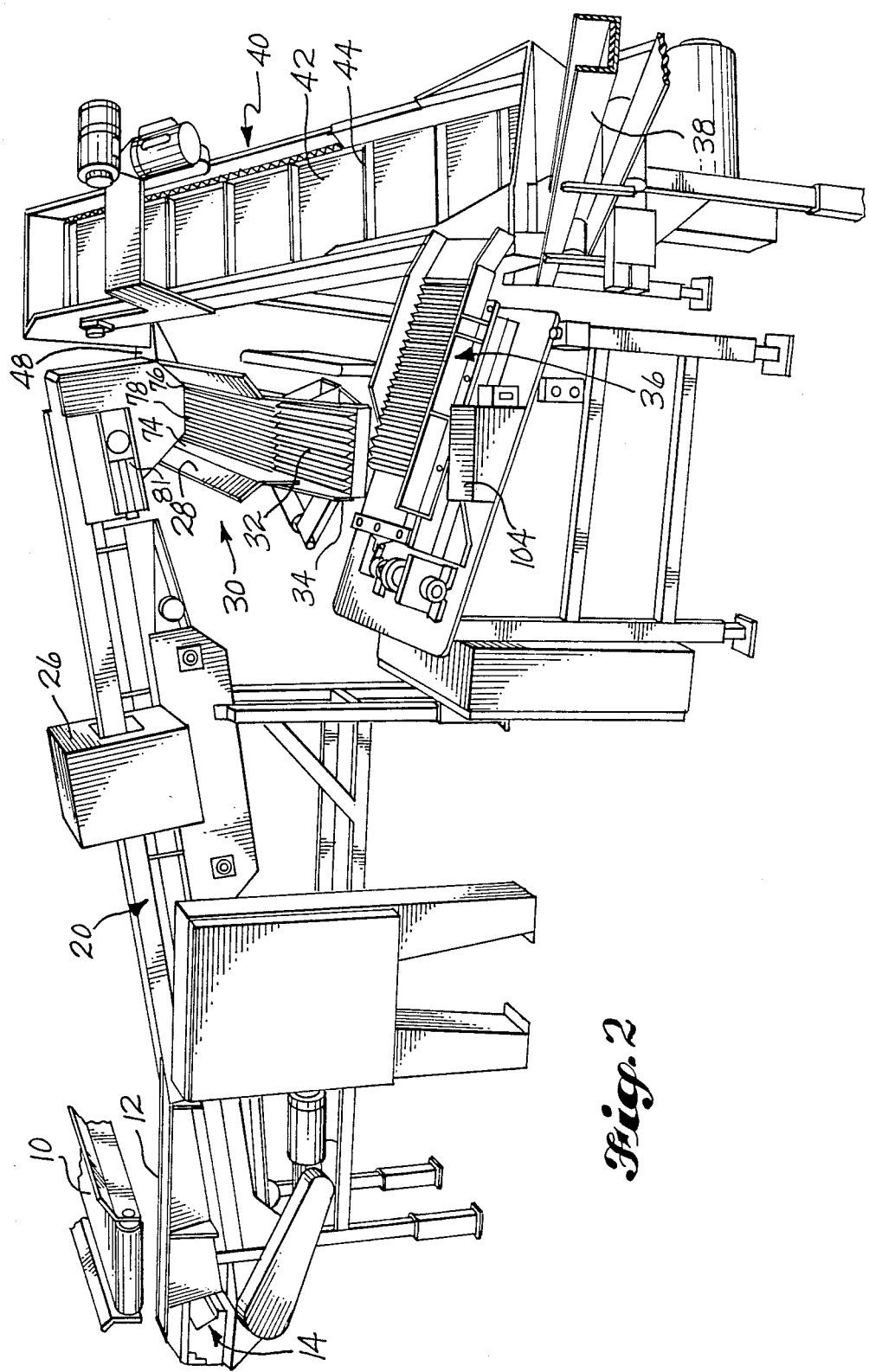
FIG. 2 is an enlarged scale pictorial view of the components of the system, at the infeed side of the working area, such view being taken substantially along the aspect of line 2—2 of FIG. 1.

Referring now to FIG. 2, the orientor 30 comprises a movable upper portion 72 and a fixed frame lower portion. The hopper 28 is a part of the upper portion 72. The hopper 28 is defined by opposite sidewalls 74,76 and a bottom wall 78. The sidewalls 74,76 may include upper portions which flare outwardly. The upper portion 72 also includes an endwall 81 on which a rotating weight vibrator is mounted (not shown in FIG. 2, but on the opposite side of endwall 81). The orientor 30 is not per se a part of the present invention but is described in detail and claimed in the aforementioned copending application Ser. No. 07/270,130, filed Nov. 10, 1988, and entitled "Article Singulating System and Method".

Figure 4:
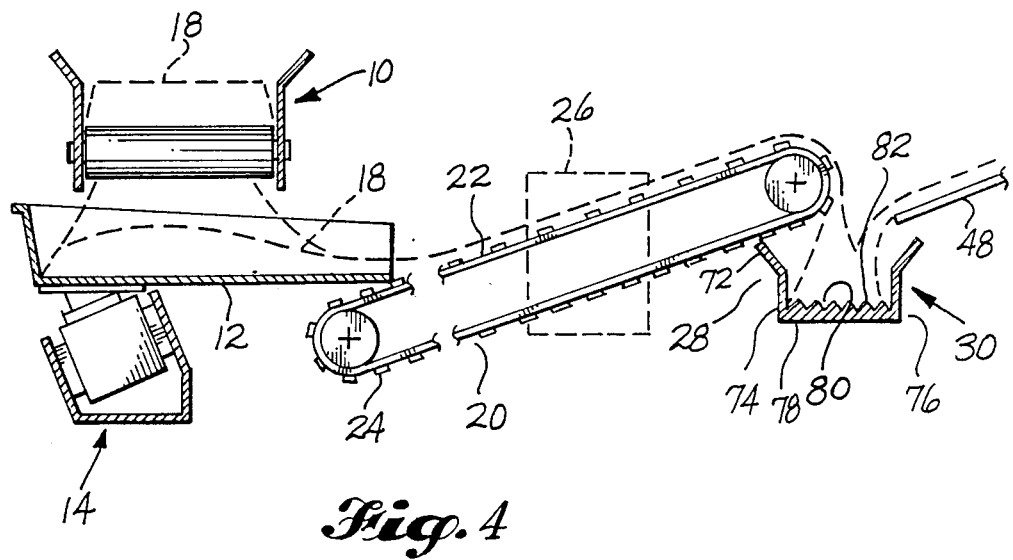
FIG. 4 is a view like FIG. 3, taken substantially from the aspect indicated by the line 4—4 in FIG. 1.

As shown by FIGS. 2 and 4, the bottom wall 78 is constructed to present a plurality of parallel channels 80 (FIG. 4) which extend longitudinally of the bottom wall 78. As the upper portion 72 moves, the drill bits 16 within the hopper 28 are thrown forwardly and as they move they are contacted by the channel walls and influenced by them into the channels 80. As it moves, the hopper 28 continues to impart motion to the drill bits 16 which are in the channels 80, and moves them lengthwise of the channels 80 towards the gauge openings 32.

Figure 5:
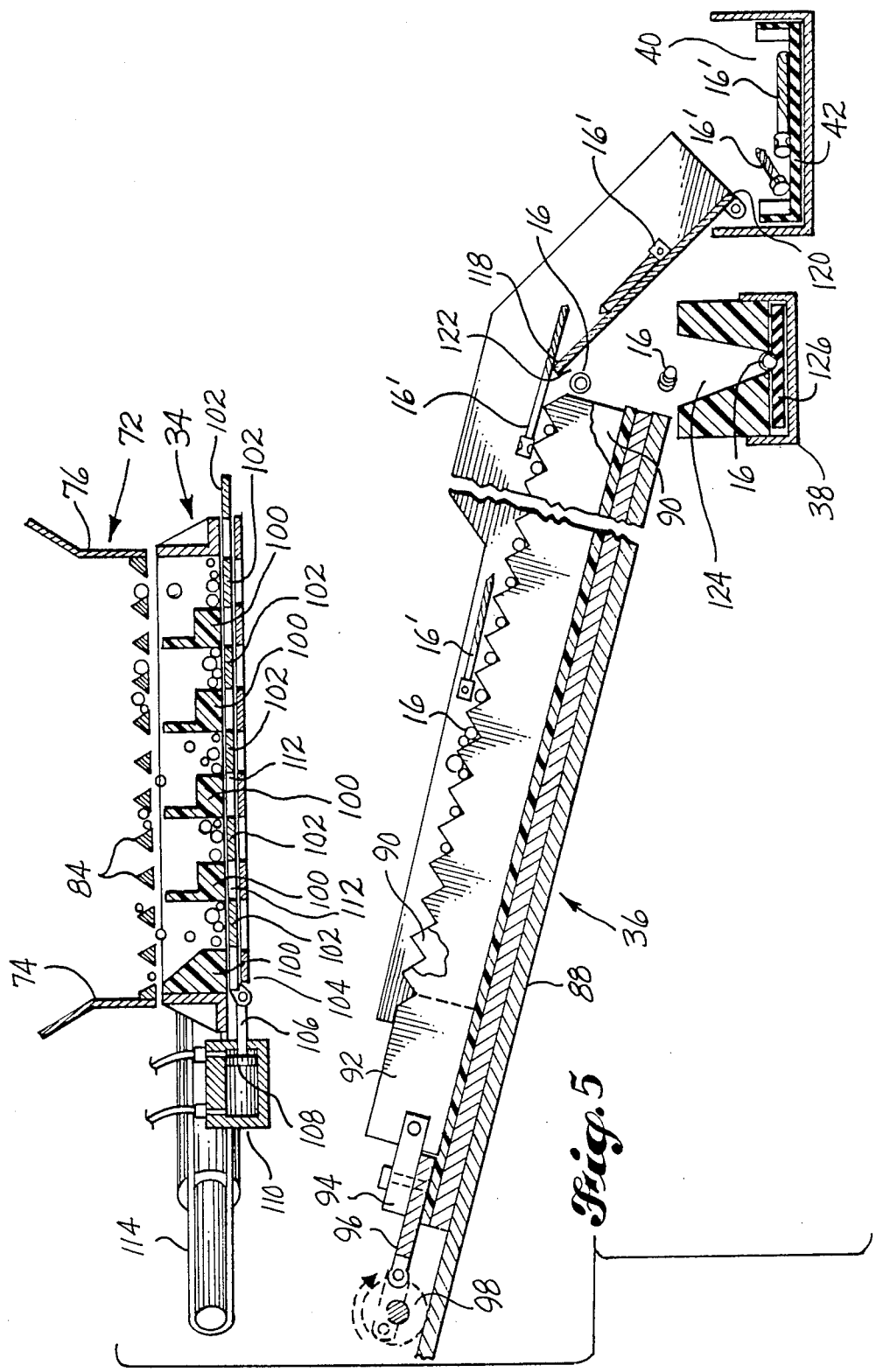
FIG. 5 is an enlarged scale sectional view taken transversely through the discharge portion of the alignment conveyor, and longitudinally of the singulator, such view showing drill bits being collected in a collector which is positioned below the outfeed end of the alignment conveyor.
Figure 6:
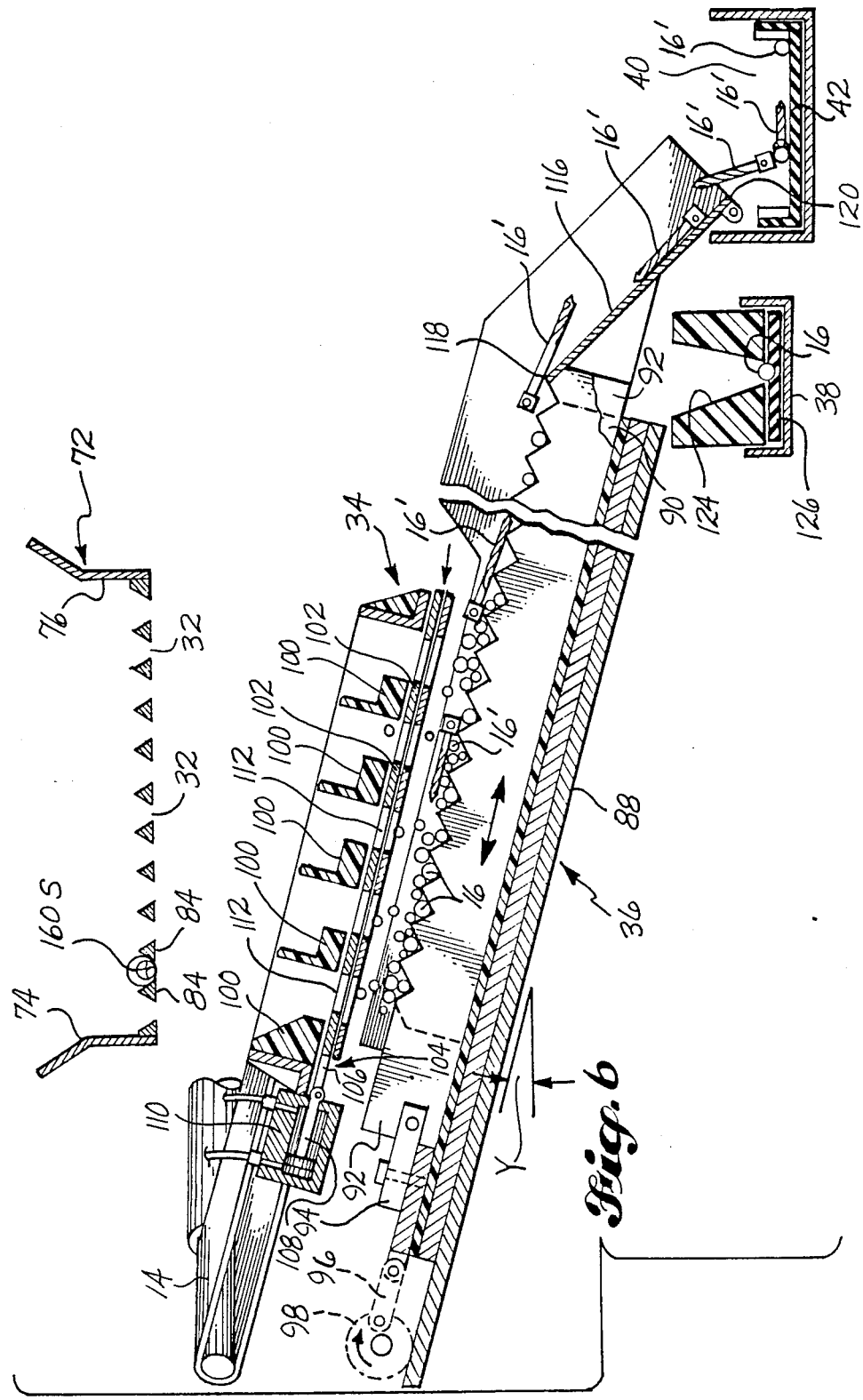
FIG. 6 is a view like FIG. 5, but showing the collector lowered and opened, and in the process of depositing drill bits onto the singulator.
Figure 7:
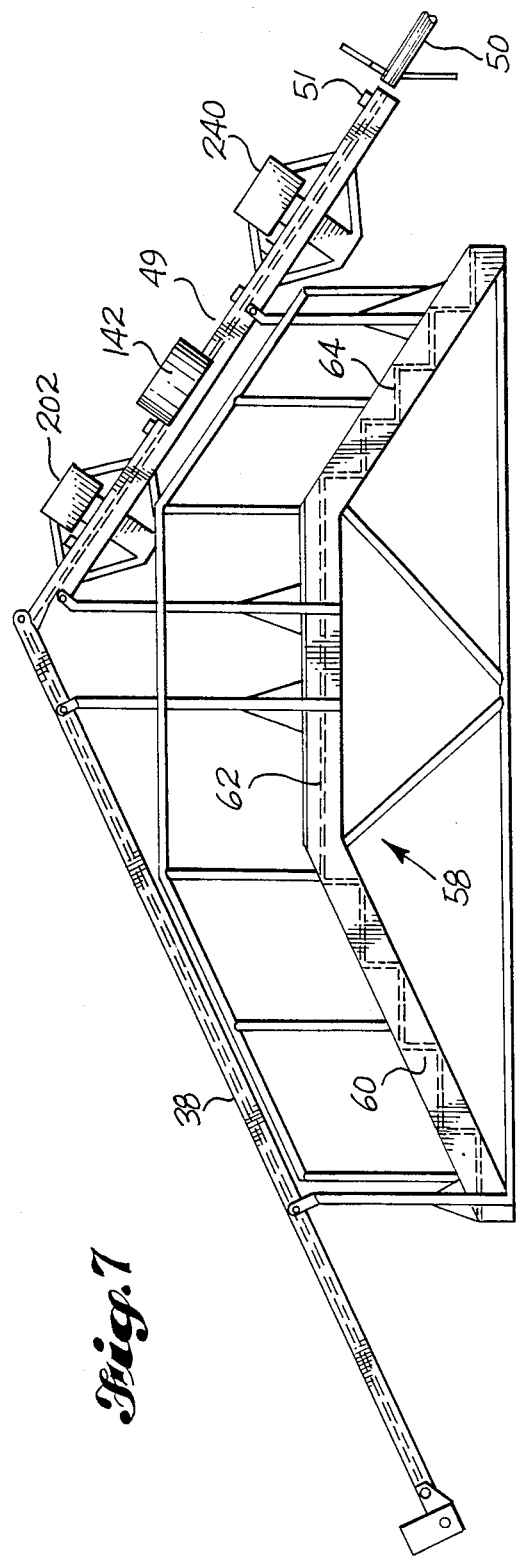
FIG. 7 is a side elevational view, taken from inside of the work area, and looking toward the elevating conveyor, the gravity conveyor, and the various components of the system associated with it, and a support frame for the two conveyors and a stairway and elevated platform which are incorporated in the frame, and allow operator access to the elevated portions of these conveyors.
Figure 8:
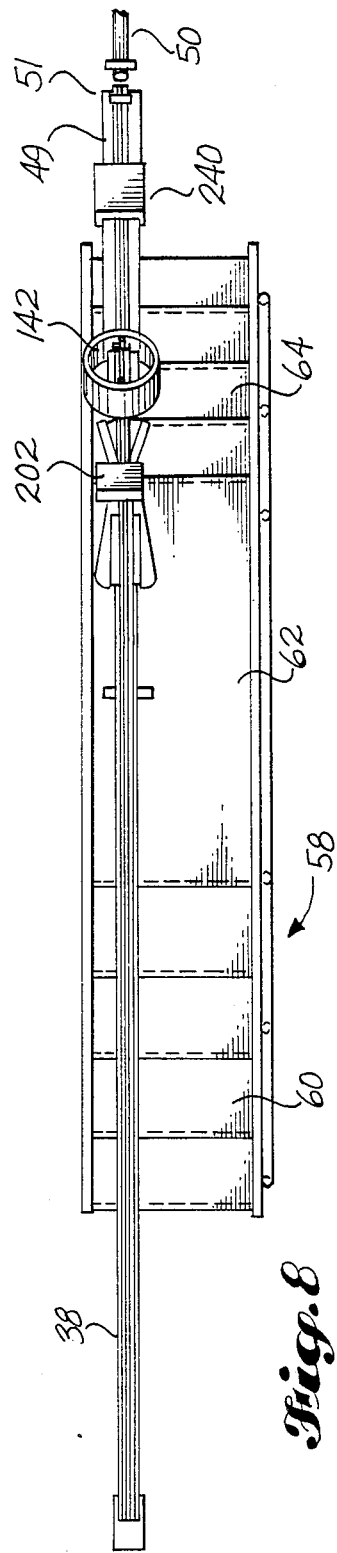
FIG. 8 is a top plan view of the portion of the system shown by FIG. 7.

The channels 80 (FIG. 4) may be formed by and between a plurality of parallel bars 82, each having a triangular cross-section and a base which is secured to the bottom wall 78. These bars 82 are secured to the bottom wall 78 so that the bottom wall 78 forms a closure for the spaces between the bars. At the discharge end of the hopper 28, the bottom wall 78 is replaced by the collector 34 and bars 82 are replaced by bars 84. The bars 84 extend along in a straight line from bars 82, but the regions between the bars 84 are open at their bottoms. The spaces between the bars 84 are the gauge openings 32 (FIGS. 5 and 6). The apexes of bars 84 are a straight line continuation of the apexes of bars 82, but the bars 84 are shorter than bars 82, from their apexes down to their bases. This shortening of the bars 82 also makes them narrower at their bases and causes the spaces 32 to be defined by and between adjacent bars 84. Any drill bits 16 or other article that is below a predetermined maximum diameter or transverse dimension, falls through the gauge openings 32 into the collector 34. Any oversize drill bit 160S (FIG. 6) or other article remains supported on a pair of the bars 84 and continues to be moved by the movement of the hopper 30 and eventually is deposited within a receptacle (not shown) that is positioned endwise outwardly and below the outfeed end of the hopper 30. In FIG. 2 a support for the receiving receptacle is designated 86. This receptacle has been omitted, to allow viewing of the upper portion of the singulator 36. However, the receptacle may be in the form of a rectangular container with a base sized to fit on support 86 in a height to place its open upper end slightly below the level of the discharge end of the hopper 30.

Referring to FIGS. 5 and 6, the singulator 36 comprises a base 88 which, in preferred form, slopes both longitudinally and laterally. The lateral or sideways slope is downwardly from the far side of the singulator 36, as shown in FIG. 2, to the near side. FIGS. 2, 5 and 6 clearly show the longitudinal slope of the singulator 36. It is indicated by an angle "Y" measured between the horizontal reference line and the second reference line that is parallel to the sloping base 88.

The singulator 36 is quite simple. It comprises a plurality of side-by-side placed, substantially identical, flat bars or slats having sawtooth upper portions, defining alternating peaks and valleys. The slats are divided into two groups. The alternate slats 90 are fixed. The intermediate slats 92 are movable. In FIG. 5 the movable slats 92 are in a position with their peaks and valleys in alignment with the peaks and valleys of the fixed slats 90. In this position, the lower ends of the slats 92 are in alignment with the lower ends of the slats 90. In this condition, the singulator 36 is composed of peaks and valleys which alternate throughout the full length of the singulator 36, and which extend uniformly throughout the width of the singulator 36.

Upper end portions of the movable slats 92 are connected together and the assembly of movable slats 92 is connected to a plate 94 which in turn is connected by a link 96 to a crank 98. Rotation of crank 98 causes the link 96 to first pull and then push the connector plate 94 and the movable slats 92 to which it is connected relative to the fixed slats 90. The stroke of movement is one tooth of the singulator 36. FIG. 6 shows a full extension of the movable slats 92 by the distance of a tooth width. Crank 98 may be rotated by any suitable rotary drive mechanism.

The details of a preferred construction of the singulator 36 are sent forth in the aforementioned copending application Ser. No. 07/270,130, filed Nov. 10, 1988, and entitled "Article Singulating System and Method". That application also includes a series of views showing the singulator being operated for moving the drill bits 16 downwardly and at the same time separating each from the others, so that at the lower end of the singulator 36, individual drill bits 16 are deposited onto the upper run of the conveyor 38, as shown in FIG. 5.

FIG. 5 shows the collector 34 in an up position. Collector 34 comprises a plurality of separator walls 100 which extend longitudinally of the collector 34, parallel to the bars 84 and the gauge openings 32. Spaces between the walls 100 are aligned with the gauge openings 32. The spaces between the walls 100 are collection channels. These collection channels are normally closed at their bottoms by doors 102. Doors 102 are elongated bar shaped sections of a plate 104. Plate 104 is guided for sideways reciprocation relative to the collector 34. One end of the plate 104 is connected by a suitable connector structure 106 to a piston 108 that is a part of a double acting air motor 110. The application of pressure to the rod side of the piston 108 causes the piston 108 and the plate 104 to be moved to the left, as pictured in FIG. 6. This moves the doors 102 out of registry with the collection channels and instead moves slot openings 112 in registry with the collection channels. Slot openings 112 are formed in the plate 104 between the doors 102. FIG. 5 shows the doors 102 aligned with the collection channels. FIG. 6 shows the slot openings 112 aligned with the collection channels. As will be apparent, when the rod side of the air cylinder 110 is vented and air pressure is applied to the opposite side, the piston 108 and the plate 104 are moved back into a position placing the doors 102 into registry with the collection channels.

The collector 34 is pivotally mounted at one side of the orientor 30, by a diagonal hinge mechanism 114 which is constructed and arranged to mount the collector 34 for pivotable movement between an up position, in which it is substantially horizontal, and a lowered position in which it substantially matches the two directional slope of the singulator 38. FIG. 5 shows the collector 34 in its up position, with the collection channels adjacent the gauge openings 32. FIG. 6 shows the collector 34 in its down position, with the collection channels open and closely adjacent the upper end portion of the singulator 36.

A ramp or apron 116 is located at the lower end of the singulator 36. It slopes downwardly from an upper end 118 to a lower end 120 (FIGS. 5 and 6). As shown by FIG. 5, when the movable slats 92 are retracted, a gap 122 is defined between the lower row of peaks of the plates 90,92 and the edge 118. This is because the lower row of peaks in the fixed slats 90 is spaced from the edge 118. When the movable slats 92 are extended, they move down into a position contiguous the edge 118. At this time, there is no gap 122 (FIG. 6).

Drill bits 16 which have aligned themselves with the valleys of the singulator 36, and have been moved down the singulator 36, valley-to-valley, drop off of the lower end of the singulator, one at a time, through the opening 122 (FIG. 5). Drill bits 16 drop one at a time into a hopper 124, having vertically downwardly converging sidewalls. Each article 16 drops into, or is guided by the sidewalls into a center groove formed in the upper run of a conveyor belt 126 which is a part of the elevating conveyor 38. The drill bits 16 are deposited onto the belt 126, and into the groove, one at a time, each spaced and positioned from the article 16 ahead of it.

FIG. 5 shows what happens to an article 16' which becomes aligned crosswise with the peaks and valleys of the singulator 36. It slides down the peaks, over edge 118, and down ramp 116, into a collector region of the return conveyor 40. The drill bits 16' fall onto the upper run 42 of the return conveyor 40.

FIG. 9 is a schematic diagram of an upper end portion of the gravity conveyor 49. It shows a drill bit 16 in the process of sliding down the gravity conveyor 49. The particular drill bit 16 that is illustrated has a pointed front end and a rear end adapted to be received in a power drill. The portion of the gravity conveyor 49 that is illustrated comprises an upper lead in section 128, a rotatable intermediate section 130, and a lower lead-out section 132. Each conveyor section 128,130,132 includes a section of a slideway 134 which may be of channel form, and in which and along which each drill bit 16 slides. FIG. 11 shows an example configuration of the slideway channel 134. In each conveyor section 128,130,132, the channel 134 may be formed in an elongated member 136,138,140, which is constructed from a self-lubricating plastic material to cut down friction between the drill bit 16 and the surfaces of the slideway 134 which are contacted by them.

Figure 14:
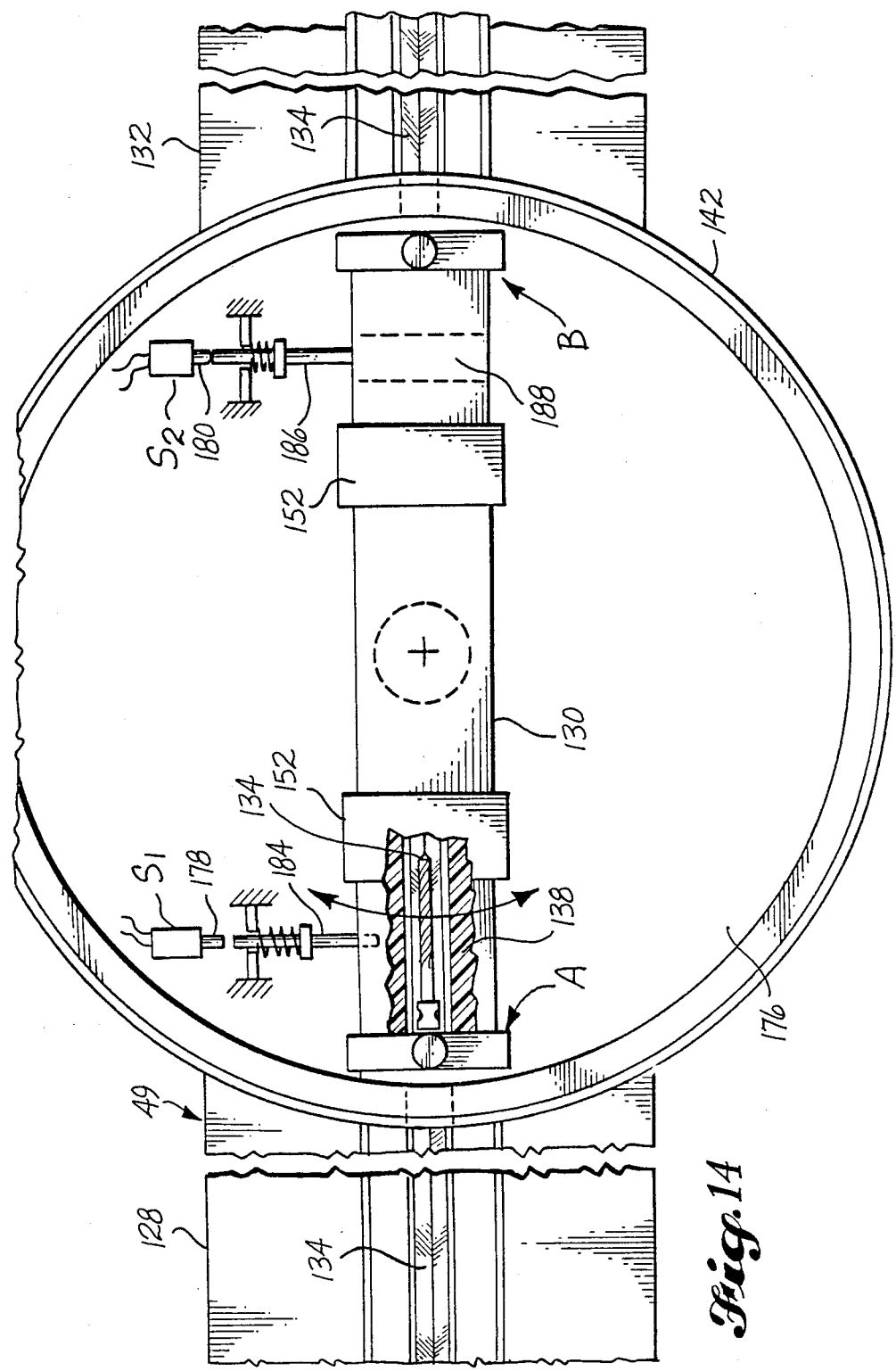
FIG. 14 is a top plan view of the rotatable conveyor section, with some parts omitted and others shown in section, and still others shown schematically, such views showing the ends "A" and "B" of the rotatable section in the same orientation as they appear in FIGS. 9 and 10.

As shown in FIGS. 9, 10 and 14, the conveyor sections 128,130,132 are in coplanar alignment, and they slope downwardly from the upper section 128 to the lower section 132. The slope of the conveyor 128,130,132 is such that any drill bit 16 placed in the slideway 134 will freely slide down the slideway 134, under the influence of gravity alone.

The portion of the system illustrated by FIGS. 9-14 is a part of a "no hands" system (i.e. a mechanized system) for sorting drill bits 16. In such system, it is usually important that all of the drill bits 16 move with a common end forward. The rotatable conveyor section 130 functions to correct the orientation of any drill bit 16 that is delivered to it wrong end first.

Referring to FIGS. 9, 10 and 14, the rotatable conveyor section 130 may be positioned within a cylindrical housing 142 which is fixed in position and includes tunnel openings 144,146 in its sidewall in alignment with the slideway 134. FIG. 11 shows the shape of opening 144. Opening 146 may be identical in shape, so it has not been separately illustrated. Housing 142 is either open at its top or is provided with a removable lid (not shown).

The rotatable conveyor section 130 includes a body 138 which, as previously stated, is preferably constructed from a self-lubricating plastic material. The body 138 may be connected to a central hub structure 148 which is in turn connected to a shaft 150. In FIG. 9, the slideway 134 in rotatable section 130 is shown open at its top. However, in preferred form, the slideway 134, where it extends through the rotatable conveyor section 130, is closed at its top and may be circular in cross-section. This is shown in FIG. 12. By way of example, connector hoops 152 may extend about both the body 138 and the hub structure 148, for connecting the body 138 to the hub structure 148 (FIGS. 10 and 12).

As shown by FIGS. 9, 10 and 14, a closure gate is provided at each end of the rotatable conveyor member 138. One end of the conveyor member 138 is designated "A". The gate at that end is designated 154. The opposite end of conveyor member 138 is designated "B". The gate at end "B" is designated 156. In preferred form, gate 154 is moved up and down by an air cylinder 158. Gate 156 is moved up and down by a second air cylinder 160. The gates 154,156 are connected to their respective air cylinders 158,160 by piston rods 162,164. The gates 154,156 are shaped to fit down into a drill bit blocking position in the slideway 134 when the piston rods 162,164 are extended. When the piston rods 162,164 are retracted, the gates 154,156 are spaced upwardly above the slideway 134 a sufficient distance to allow passage of the drill bits 16 along the slideway 134 unimpeded by the gates 154,156. As shown by FIGS. 10 and 14, the air cylinders 158,160 are mounted onto end portions of the body 138. They are fixed in position relative to the body 138 and they rotate with the body 138.

FIG. 13 is a schematic showing of a drive 212 that is provided for rotating the rotatable conveyor section 130 180°. A pinion gear 166 is secured to the shaft 150. A first rack 168 engages one side of the pinion gear 166. A second rack 170 engages the opposite side of the pinion gear 166. Rack 168 is reciprocated by an air motor 172 and rack 170 is reciprocated by an air motor 174. Extension of the two racks 168,170 causes rotation of shaft 150, and conveyor section 130, in a first direction. Retraction of the racks 168,170 causes a reverse rotation.

Housing 142 may include a bottom wall 176 spaced below the bottom surface of body 138. As shown by FIG. 14, a pair of position sensors $S_1$, $S_2$, may be mounted on the bottom wall 176. The sensors $S_1$, $S_2$ are shown to include plungers 178,180 which are directed essentially perpendicular to the body 138. Plunger 178 is in axial alignment with a push rod 184. A second push rod 186 is in axial alignment with plunger 180. As shown by FIG. 14, the push rods 184,186 are normally spring biased away from the plungers 178,180. The plunger 178 and push rod 184 at the upstream end of the housing 142, and the plunger 180 and push rod 186 at the lower end of the housing 142 are located below the rotational path of the body 138. However, body 138 includes a depending abutment 188 at one of its ends. Abutment 188 is positioned to make contact with, and depress a push rod 184,186 in its path. Thus, when the rotatable body 138 is in the position shown by FIG. 14, the abutment 188 makes contact with and depresses push rod 186. Specifically, it pushes push rod 186 into a depressing engagement with the plunger 180. At the opposite end of the rotatable body 138, the push rod 184 is untouched by the rotatable body 138. However, when the rotatable body has rotated 180°, the abutment 180 is swung over into depressing contact with the push rod 184. Push rod 186 is then free of contact with the rotatable body 138. As a result, plunger 186 is no longer depressed, but push rod 184 has depressed plunger 176. A depressed plunger 178,180 operates its sensor $S_1$, $S_2$, to identify the particular end-to-end orientation of the rotatable conveyor section 130. The two sensors $S_1$, $S_2$ and the abutment 188 are used to provide a signal to be sent to the computer "A", so that the computer "A" will know which of the ends "A" and "B" is in an up position and which is in a down position.

Referring back to FIG. 9, the system may also include position sensors $S_3$, $S_4$, $S_5$ and $S_6$. The function of sensor $S_3$ is to detect the presence or absence of a drill bit 16 against a gate 190. Sensor $S_4$ determines the presence or absence of a drill bit 16 against gate 192. Sensor $S_5$ determines the presence or absence of a drill bit 16 against whichever of gates 154,156 is at the lower end of the rotatable conveyor section 130. Sensor $S_6$ determines the presence or absence of a drill bit 16 against gate 194.

Gates 154 and 156 have been described. Gates 190,192,194 may be in the form of swing arms which are swung up and down by rotary solenoids, such as gate $G_4$ which is illustrated and hereinafter described. When a gate 190,192,194 is in its "down" position, the swing arm is located within the slideway 134, in a position to block sliding movement of a drill bit 16 along the slideway 134. When a gate 190,192,194 is in its "up" or retracted position, it is spaced above the slideway 134 a sufficient amount to allow a drill bit 16 to slide under it.

Referring again to FIG. 9, an optical micrometer 202 is shown positioned to provide a scanner beam 204 which extends normal to the slideway 134 in the infeed section 128 of the slide conveyor 49. By way of typical and therefore nonlimited example, the optical micrometer 202 may be of a type manufactured by Techmet Company of 6060 Executive Boulevard, Dayton, Ohio 45424, and sold under the name LASERMIKE ™. This particular optical micrometer 202 includes a low power helium-neon laser 206 which provides a very narrow and parallel laser beam 208, approximately 0.25 mm (0.01 inches) in diameter. This beam 208 is converted into a radially scanned beam 210 by a motor-driven multi-sided rotated mirror 212. The radially scanned beam 210 is converted into parallel scanning beam 204 by means of a scan lens set 214,216 oriented such that its focal point coincides with the center of the rotating motor-driven mirror 212. The lens set 214,216 is designed so that the parallel scanning beam 204 has a constant scanning velocity as it sweeps across the working area WA of the instrument. This scanning beam 204 provides a basis for making a no-contact measurement of a drill bit 16 as it moves through the scanning beam 204. Individual diameters are delivered to the computer. The computer analyzes the diameters to determine characteristics (geometrical) of the drill.

A drill bit 16 is in a working area WA of the scanner beam 204 for a period of time proportional to its object profile along the scan path. The interrupted beam is collected by the receiving lens 216 and is focused into a photo detector 218 which converts the collected light to a time dependent signal. This time dependent signal is sent via connection 220 to the computer "A". The purpose of scanner beam 204, in the system of this invention, is to identify enough of the shape of the drill bit 16 to provide determination of which end of the drill bit 16 is leading and which end is trailing. This information is delivered to the computer "A" via the connection 220. Signals generated by the sensors $S_1$, $S_2$, $S_3$, $S_4$, $S_5$, $S_6$ are also delivered to the computer "A". The computer output includes a connection to the drive 222 for drive shaft 150. The computer "A" also sends out a control signal via path 224 to the air supply for the air cylinders 158,160. Paths 226,228,230 send control signals to the solenoids which operate the gates 190,192,194.

In operation of the system, the computer "A" will not raise the gate 190 for the purpose of allowing a drill bit 16 to slide down the slideway 134 until it receives input signals informing it that downstream of gate 190 the system is ready to receive the next drill bit 16. When the signal is received, gate 190 is raised and the next drill bit is allowed to slide down the slideway 134.

In FIG. 9, a drill bit is shown in the working area WA, in the process of being scanned by the scanner beam 204. Drill bit 16 then continues down slideway 134 until it contacts gate 192. Gate 192 will not be opened until the various signals received by computer "A" tell it that downstream of gate 192 the system is ready to receive another drill bit 16. When this condition happens, the gate 192 is raised to allow the drill bit 16 to slide through opening 144 into the rotatable conveyor section 130. At this time, gate 154 will be in an "up" position. If the end-to-end orientation of drill bit 16 is proper, gate 154 will remain in an "up" position. If the orientation is not proper, after article 16 has slid down into a position within the rotatable section 130, against gate 156, and its presence there is sensed by the sensor $S_5$, gate 154 will be closed and a drive signal will be sent by the computer "A" to the drive 222, causing it to rotate the rotatable body 138 180°. In the process, the end-to-end orientation of the drill bit 16 will be reversed. Also, the drill bit 16 will slide down into contact with gate 154 which now assumes the lower position. The presence of the drill bit 16 against the gate 154 is detected by sensor $S_5$. A signal from sensor $S_5$ and a signal received from sensors $S_1$, $S_2$ to the effect that the body 138 has been rotated will instruct the computer "A" to lift gate 154 to allow the drill bit 16 to slide down into a position against gate 194. Any drill bit 16 entering the rotatable conveyor section 130 will encounter a downstream gate (gate 154 or 156) which is in a "down" position. If the end-to-end orientation of the drill bit 16 is proper, the downstream gate will stay closed until the preceding drill bit 16 has moved past gate 194, providing a space at gate 194 for another drill bit 16. More specifically, if a drill bit 16 moves against a downstream gate 154 or 156, with the wrong end leading, this condition is detected when the drill bit 16 moves through the scanning beam 204. This sends a measurement signal to the computer "A" informing it that the end-to-end orientation of the drill bit 16 is improper. The computer "A" will respond by commanding the drive 222 to rotate the rotatable conveyor section 130 a full 180°, reversing the end-to-end orientation of the drill bit 16 that is in the conveyor section 130. The drill bit 16 will then slide down into contact with the gate 154 or 156 which has been repositioned to become the lower gate. The sensor $S_5$ senses the presence of the drill bit 16 against the lower gate 154 or 156 and produces a signal. This signal and signals received from sensors $S_1$, $S_2$ to the effect that the conveyor section 130 has been rotated, will instruct the computer "A" to lift the new downstream gate 154 or 156 and allow the drill bit 16 to slide down into a position against gate 194. The rotatable conveyor section 130 remains in its new position, with the gate that was previously the upstream gate now being the downstream gate and vice versa. Then, when the next drill bit 16 comes along with an improper end-to-end orientation, its orientation can be reversed by a reverse swing of the rotatable conveyor section 130 a full 180° back to the old start position.

FIG. 15 illustrates a portion of the system that in preferred form is located downstream of the just-described orientation system (FIGS. 9-14). A drill bit 16 is shown within the slideway 134 against a gate $G_1$ which may be the previously described gate 194, or a gate downstream of it. For the purposes of describing the portion of the system shown by FIG. 15, gate $G_1$ will be referred to as the "ready" gate. It, like the previously described gates, is movable vertically between a "down" or stop position within the slideway 134 and an "up" or retracted position. A drill bit 16 coming from the orientation system slides down the slideway 134 until it contacts ready gate $G_1$. Ready gate $G_1$ holds it in position until the system is ready to identify it. Then, the ready gate $G_1$ is raised to allow the drill bit 16 to slide further downwardly until it contacts a second gate $G_2$, hereinafter referred to as the "lead" gate. Lead gate $G_2$ is also movable vertically between a down or stop position within the slideway 134 and an up or retracted position. In addition, gate $G_2$ is mounted on a carriage (not shown) which is operable for moving the gate $G_2$, and a drill bit 16 that is against it, downwardly along the gravity conveyor 134 at a controlled rate of travel. The carriage and other components associated with it are specifically disclosed and claimed in the aforementioned copending application Ser. No. 07/270,221, filed Nov. 10, 1988, and entitled "Article Sorting Apparatus and Method".

Figure 17:
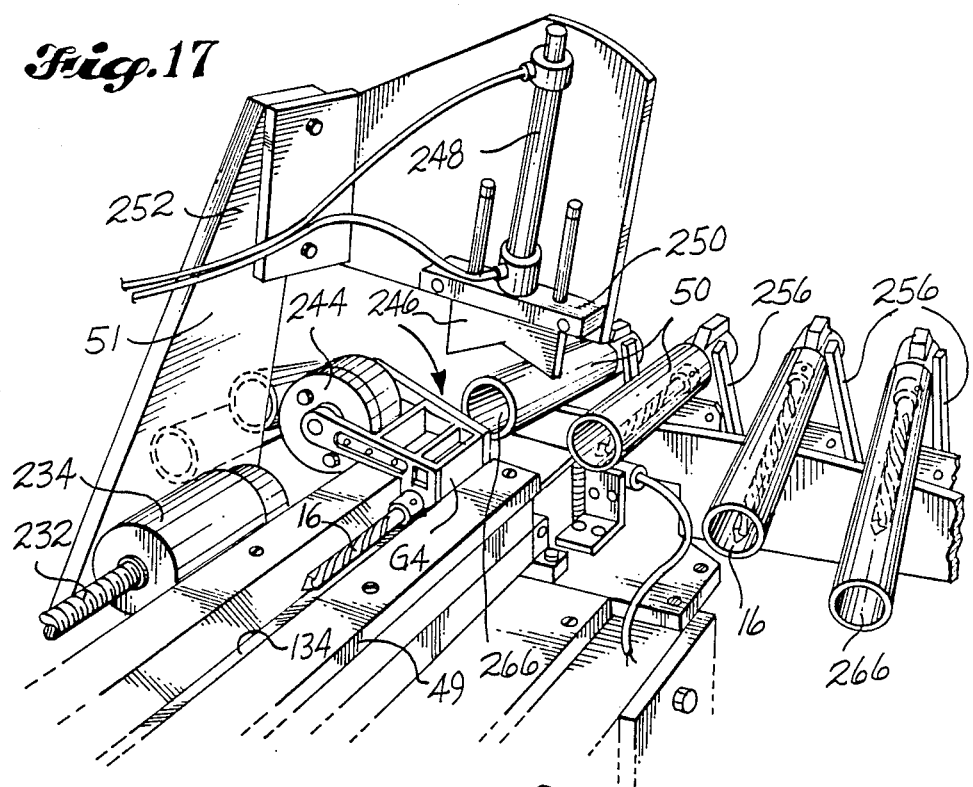
FIG. 17 is a fragmentary pictorial view looking towards the lower end of the slide conveyor and the drill bit loading station of the endless conveyor, such view showing the load gate in the down position and a drill bit against the load gate, and showing a carrier tube at the article loading station in an up position.
Figure 18:
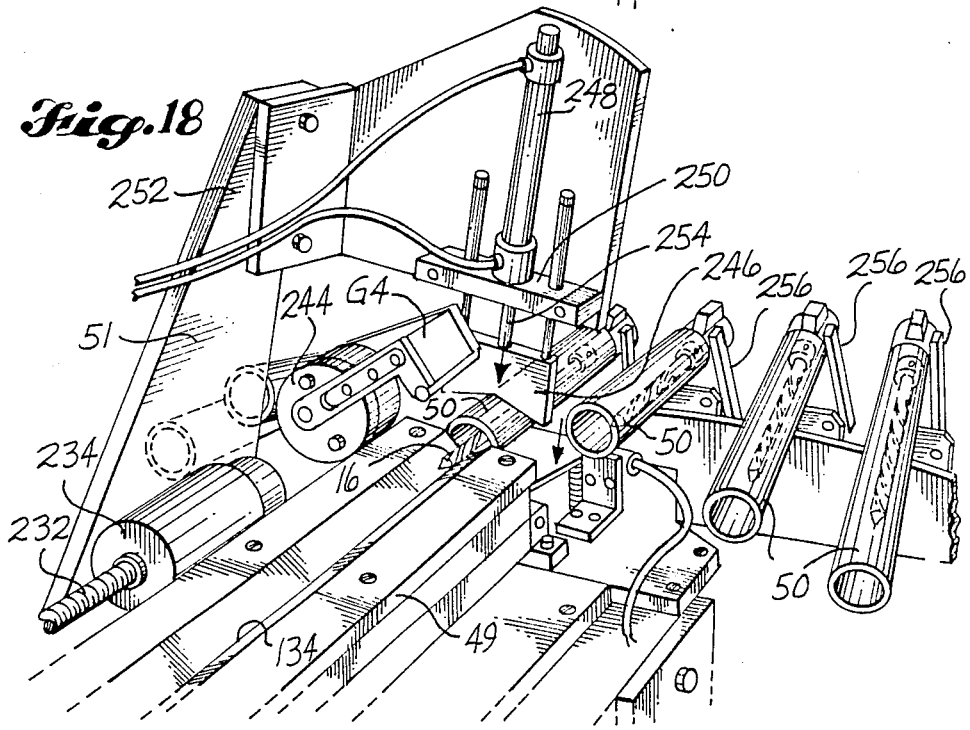
FIG. 18 is a view like FIG. 17, but showing the load gate retracted, the carrier tube at the article loading station depressed into a position placing its open end in axial alignment with the slideway of the gravity conveyor and showing the drill bit in the process of sliding into the end of the carrier tube.

FIGS. 17 and 18 show portions of a lead screw drive 232 for moving the carriage and a reversible motor 234 for driving the lead screw. Rotation of the lead screw 232 in one direction causes a movement of the carriage and the lead gate $G_2$ downwardly at a controlled rate. Reverse rotation of the lead screw 232 moves the carriage and gate $G_2$ back up to a start position.

The drill bits 16 to be sorted may comprise plural species which are identical in terms of physical characteristics, e.g. length and diameter, but which are constructed from different metals. FIG. 16 shows a material composition detector 236, which may be positioned in series between the orientation system and the ready gate $G_1$. The drill bits 16 to be sorted slide along the slideway 134 through a detection beam 238 (e.g. an X-ray beam) which identifies the presence or absence of a certain chemical element in the drill bits 16. This information is fed to a computer "B" and is used together with physical information obtained from an optical micrometer 240 to control delivery of the identified drill bit 16 to its dedicated receiving receptacle 54. A control gate $G_3$ may be positioned between the material detector 236 and the ready gate $G_1$. A sensor $S_7$ may be positioned to detect the presence or absence of a drill bit 16 at the gate $G_3$. A preferred form of metal detector is disclosed and claimed in copending application Ser. No. 07/316,171, filed Feb. 24, 1989, and entitled "Material Composition Analyzer and Method".

Referring to FIG. 15, a retraction or raising of the ready gate $G_1$ out of the path of the drill bit 16 allows the drill bit 16 to free slide down the slideway 134 into a position against the lead gate $G_2$. A sensor $S_8$ determines the presence or absence of a drill bit 16 at ready gate $G_1$. The sensor $S_9$ determines the presence or absence of a drill bit 16 at lead gate $G_2$. When a drill bit 16 has been moved against $G_2$, and the system is ready to advance it, computer "A" sends a control signal to the motor 234, causing it to rotate the lead screw 232 in a direction moving the carriage and the lead gate $G_2$ downwardly along the slideway 134. The drill bit 16 moves with the gate $G_2$ and in this manner is moved at a controlled rate of travel through a scanner beam 242 which is generated by the optical micrometer 240. The optical micrometer 240 is described in detail in the aforementioned copending application Ser. No. 07/270,221, filed Nov. 10, 1988, and entitled "Article Sorting Apparatus and Method". When the carriage and lead gate $G_2$ are at their lower end of travel, and the system is ready to receive the drill bit 16 at load gate $G_4$, lead gate $G_2$ is lifted, allowing the drill bit 16 to slide on down the slideway 134 into a position against load gate $G_4$. Sensor $S_{10}$ determines the presence or absence of a drill bit 16 at the load gate $G_4$ and sends this information to the computer "A". The drill bit 16 stays in position against the load gate $G_4$ until an empty carrier tube 50 is properly positioned at the load station 51. Then, load gate $G_4$ is raised or retracted to allow the drill bit to slide into the carrier tube 50 (FIG. 18). FIG. 17 shows load gate $G_4$ in a down position and shows it in the form of a swing arm connected to a rotary solenoid 244.

Each new carrier tube 50 is delivered to the load station 51 in a sloping attitude with its open end 266 raised. When an empty carrier tube 50 to be loaded is stopped at the load station 51, a depress element 246 is moved downwardly by an air cylinder 248. The air cylinder 248 is mounted on a support 250 which in turn is connected to a support bracket 252. Extension of piston rod 254 moves the depress element 246 downwardly against the carrier tube 50, moving tube 50 downwardly into a position of axial alignment with the slideway 134 of gravity conveyor 49. This ready-to-receive position of the carrier tube 50 is sensed and a signal is sent to the rotary solenoid 244, causing it to lift the load gate $G_4$, to allow gravity movement of the next drill bit 16 into the tube 50. A sensor $S_{11}$ determines the presence of a drill bit 16 within a carrier tube 50. Then, depress element 246 is retracted, to allow the loaded carrier tube 50 to move upwardly so that it and the drill bit 16 in it clear the lower end of the gravity conveyor 49, enabling them to move onwardly when commanded to do so.

A stop gate $G_5$ is provided immediately endwise of the gravity conveyor 49, to prevent a second drill bit 16 from being delivered out from the slideway 134 when gate $G_4$ and a loaded carrier tube 50 are both in an up position. This gate $G_5$ is spring biased upwardly into a position blocking movement of a drill bit 16 out from the slideway 134. When a carrier tube 50 is moved downwardly, it contacts and depresses this gate $G_5$.

As shown by FIGS. 15, 17, 18 and 20, each carrier tube 50 includes a brace arm 256 which is pivotally attached at its lower end, at location 258, to a carrier unit base member 260 which is attached to the endless conveyor 52. Each arm 256 includes a generally laterally projecting limb 262. A pin 264 projects laterally from the carrier tube 50. The limb 262 and pin 264 are so positioned that when the pin 264 is within a nook formed by the arm 256 and the limb 262, the tube 50 is braced into a position with its open end 266 elevated to such an extent that a drill bit 16 within the tube 50 will not gravitate out from the tube 50. A torsion spring 268, at the lower end of the arm 256, biases the arm 256 into a substantially upright position. The details of construction of arm 256 and the associated elements are set forth in the copending application Ser. No. 07/270,221, filed Nov. 10, 1988, and entitled "Article Sorting Apparatus and Method".

For purposes of this invention, it is only important that the endless conveyor 52 deliver the contents of each filled tube 50 to the appropriate receptacle 54 and that the tubes 50 travel a closed loop path extending from the loading station 51 alongside the several receptacles 54 and then back to the loading station 51. The particular system that is illustrated was constructed to handle and sort a large number of drill bits 16. Accordingly, it was necessary to provide a large number of receptacles 54. This was conveniently done by positioning the receptacles 54 to be on one side of a helical path and to make the endless conveyor 52 travel the helical path. This arrangement made a good utilization of floor space. The helical path was developed about a vertical axis and thus it became possible to position a large number of receiving receptacles 54 within a small area of floor space. In some other installations, it may be desirable to position the receiving receptacles 54 in a different manner, or to deliver the drill bits to some other type of receiving mechanism. The helical pattern and the construction of the mechanism used to establish the helical pattern are fully disclosed and claimed in the copending application Ser. No. 07/269,991, filed Nov. 10, 1988, and entitled "Storage Mechanism for Sorted Articles".

Figure 19:
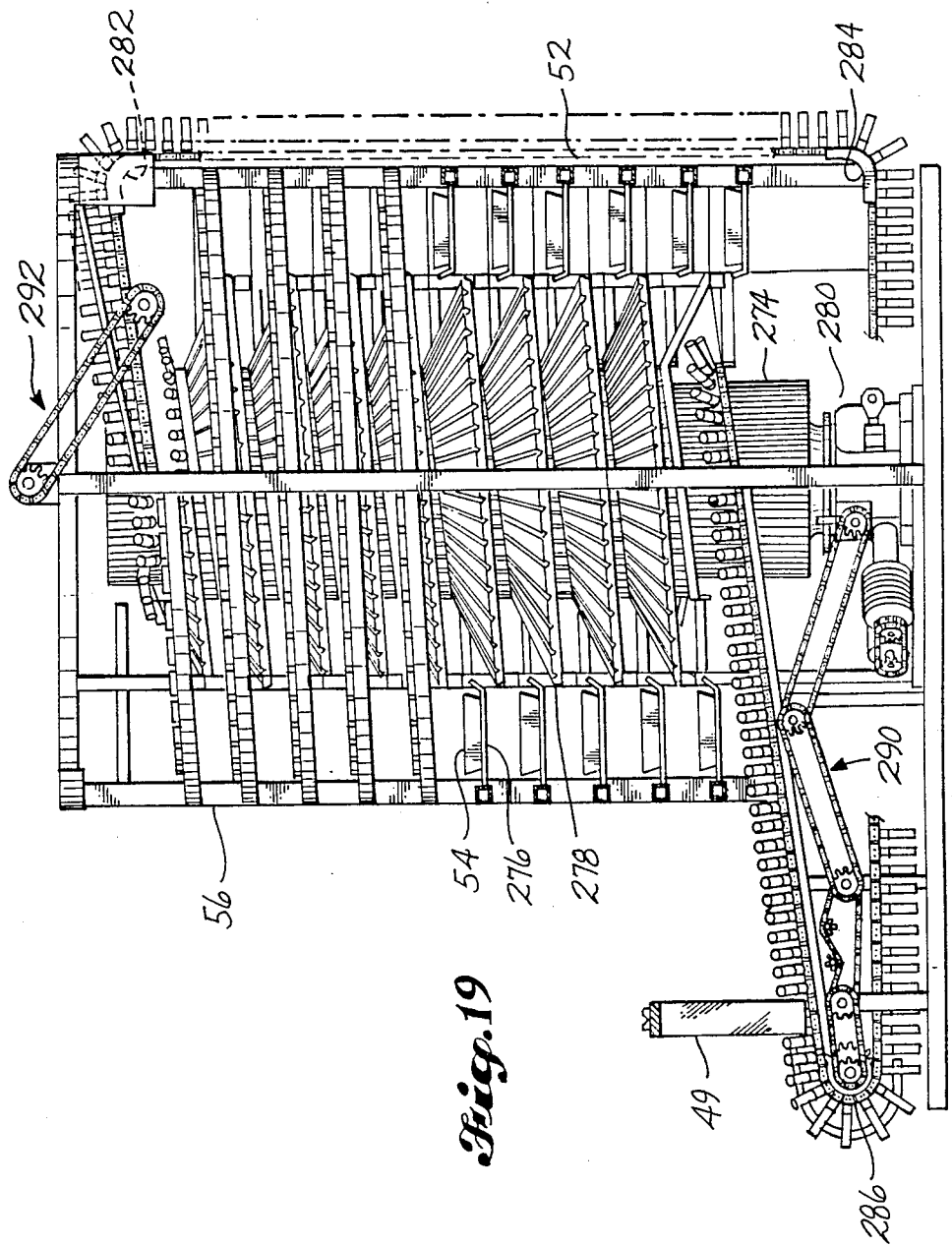
FIG. 19 is an elevational view of the sorted drill bit receiving portion of the system, with foreground portions of the mechanism omitted for clarity with illustration of other portions that would otherwise be hidden from view.

The endless conveyor 52 is a chain-like flexible member comprising the carrier tube bases 260. These bases 260 ride on track sections. FIG. 20 shows the cross-sectional configuration of the track sections 270 in the helical path portion of the system. The helical track 272 winds around a drum 274 which is supported for rotation about a vertical axis 275 (FIG. 1). The track sections 270 of the helical path portion 272 of the endless conveyor 52 are supported by the frame structure 56. This frame structure 56 also supports members 276 which are segments of a helical support for the receptacles 54. Frame 56 also supports sections of a guide ramp 278. The guide ramp 278 is also helical. The helical track 272 extends about the drive drum 274, as shown in FIG. 19. The helical ramp 278 is positioned radially outwardly from the helical track 272. The helical pattern of receptacles 54 is positioned radially outwardly from the ramp 278.

A drive mechanism 280 at the lower end of the drive drum 274 functions to drive the drive drum 274 in increments or steps. By way of example, each step may measure six degrees (6°) in arcuate length. A straight line section of the conveyor track extends from the loading station 51 to the lower end of the drive drum 274. It joins the lower end of the helical track 272 at a general tangent to the drive drum 274. The helical track 272 winds around the drive drum 274 as it extends upwardly. At its upper end, track 272 joins a straight track section which extends away from the helical track 272, at a tangent from the drive drum 274. The upper straight lead out track section and the lower lead in straight track section are substantially in the same vertical plane. As shown by FIG. 19, the endless conveyor 52 is guided off from the upper straight track section by a corner guide 282, vertically downwardly to a lower corner guide 284. The lower corner guide guides the endless conveyor 52 to extend along a lower run over to an uprighting guide mechanism 286 which guides the endless conveyor 52 upwardly to the start of the upper run which is adjacent the loading station 51.

As specifically disclosed in copending application Ser. No. 07/269,991, filed Nov. 10, 1988, and entitled "Storage Mechanism for Sorted Articles", the endless conveyor 52 includes projecting elements which engage vertical channels formed in the drive drum 274. This provides a "gear" type drive whereby the rotation of the drum 274 functions to positively drive the endless conveyor 52 along its closed loop path of travel. A lower series of chain and sprocket transmissions provide a positive drive between the drive drum 274 and the lead-in portion of the endless conveyor 52. In similar fashion, a chain and sprocket mechanism 292 provides a positive drive between the drive drum 274 and the lead-out portion of the endless conveyor 52. This is done so that each interval of movement of the drive drum 274 will result in a properly positioned interval of movement of the endless conveyor 52. Thus, each interval of movement of the drive drum 274 brings a new carrier tube 50 into proper position at the loading station 51. The receptacles 54 are spaced apart an angular distance equal to the angular interval of movement of the tubes 50. Thus, each interval of movement of the drive drum 274 causes each tube 50, when in the helical section of the conveyor path, to move from a position in alignment with a given receptacle 54 onto a position of alignment with the next receptacle 54.

FIG. 20 shows that as the carrier tubes 50 are being guided along the helical track 272, each has its position established by the engagement of the limb 262 on its position arm 256 with the pin 264 which it carries. The positioning arms 256 move along a path that is laterally inwardly bounded by the lower ends 294 of tip arms 296 (FIG. 21). The upper ends of each tip arm 296 are attached to a rotary solenoid 298 which is mounted by a mounting bracket 300 onto a lower portion of a track segment 270. Electrical energy delivered to a solenoid 298 causes the solenoid 298 to swing the tip arm 296 towards any position arm 256 that may be in its path of travel.

When a particular drill bit 16 is identified and then loaded into a particular carrier tube 50, the identification information, together with stored information in computer "B", tells the computer how many steps or positions away the just-loaded carrier tube 50 is from the particular receptacle 54 which is dedicated to receive the species of drill bit 16 that is in such tube 50. The computer "B" keeps track of the number of steps of movement of the carrier tube 50. When this carrier tube 50 reaches a position adjacent the appropriate receiving receptacle 54 for the particular drill bit 16 which it is carrying, computer "B" functions to deliver electrical energy to the particular solenoid 298 that is associated with such receptacle 54. The energized solenoid 298 then rotates its tip arm 296, against the position arm 256 in its path. This movement of the arm 256 moves the limb 262 out from under the pin 264. The disengagement of these elements removes the support for the tube 50. In response, the tube 50 drops in which its open end 266 is low enough to cause the drill bit 16 to gravitate out from the tube 50. It falls onto and is guided by the ramp 278 into its receptacle 54, as shown at the lower portion of FIG. 20.

It is to be understood that the system that has been illustrated and described is presented for purposes of example only. The scope of the invention is not to be limited by the details which are illustrated and described, but only by the claims which follow, properly interpreted in accordance with established principles of patent claim interpretation, including use of the doctrine of equivalents.

What is claimed is:

1. A method of sorting large quantities of many different types of drill bits, according to type, comprising:
   receiving the drill bits in a mixed bulk form, piled on one another in a random orientation;
   delivering said drill bits into an alignment conveyor having a bottom which includes a plurality of elongated, parallel, alignment channels, into which said drill bits migrate as they are conveyed by the alignment conveyor;
   delivering aligned drill bits from said alignment conveyor onto an upper portion of a singulator;
   moving the aligned drill bits laterally, along the singulator, and as they are moving, separating them, each from the rest;
   delivering singulated drill bits, one at a time, from the singulator onto the upper run of a conveyor belt, each spaced apart from the drill bit preceding it;
   moving said conveyor belt to carry the drill bits to the upper end of a gravity conveyor, and delivering them in succession into a longitudinal slideway that extends along the gravity conveyor;
   moving the drill bits in succession along the slideway, through an identifying means which produces an identification signal for each drill bit as to its type;
   moving the identified drill bits one at a time to a loading station;
   at the loading station, successively delivering the identified drill bits, each into a separate drill bit carrier that is a part of an endless conveyor;
   moving the endless conveyor along a path which borders a succession of dedicated receiving receptacles for the drill bits, each said receiving receptacle being provided to receive and store a particular type of drill bit; and
   by use of a computer, and stored information in the computer, and the identification signals generated for the drill bits, removing each drill bit from its carrier and depositing it into its dedicated receiving receptacle in response to movement of the carrier from said loading station to a discharge position adjacent the dedicated receiving receptacle.

2. A method according to claim 1, comprising moving the drill bits in succession, while on the gravity conveyor, through a second identifying means which identifies the particular end-to-end orientation of each drill bit, as it is moving, and produces a signal indicating the particular end-to-end orientation;
   then moving the drill bit into a rotatable section of the gravity conveyor;
   continuing movement of a drill bit which has a desired end-to-end orientation; and
   responsive to a signal indicating that a particular drill bit has an improper end-to-end orientation, stopping the drill bit in the rotatable section and then rotating said section 180°, to reverse the end-to-end orientation of the drill bit, and then continuing movement of the drill bit along the gravity conveyor.

3. A method according to claim 2, comprising after receiving the drill bits, initially conveying the drill bits piled on each other, and in a random orientation;
- moving such drill bits into a receiving receptacle of a vibrating conveyor, and vibrating the receiving receptacle for the purpose of at least partically untangling the drill bits while conveying the drill bits; and
- delivering the drill bits from the receptacle of the vibrating conveyor into the alignment conveyor.

4. A method according to claim 3, comprising conveying said drill bits from the vibrating conveyor through a demagnetizer and then into the alignment conveyor.

5. A method according to claim 1, comprising positioning the receiving receptacles in a helical pattern developed about a vertical axis, and supporting the endless conveyor to travel a helical path which borders the helical pattern of receiving receptacles.

6. A method according to claim 3, comprising controlling the feed rate of drill bits from the vibrating conveyor, so that there is a thinning and scattering out of the drill bits as they are conveyed onto the alignment conveyor.

7. A method according to claim 3, comprising conveying the drill bits to the vibrating conveyor piled relatively deep on an infeed conveyor, and turning the infeed conveyor on to deliver a quantity of drill bits into the vibrating conveyor, and operating the vibrating conveyor to shake entangled drill bits substantially free from entanglement, and then move them on in a thinned and spaced out condition relative to their condition when delivered into the vibrating conveyor.

8. A system for automated sorting of large quantities of many different types of drill bits, according to type, comprising:
- an alignment conveyor having a bottom which includes a plurality of elongated, parallel alignment channels into which some drill bits migrate as they are delivered into the alignment conveyor and into which some drill bits migrate as they are conveyed by the alignment conveyor;
- conveyor means for delivering drill bits into the alignment conveyor, in a random orientation;
- singulator means having a upper end positioned to receive drill bits from the alignment conveyor, said singulator means receiving aligned drill bits from the alignment conveyor and moving them laterally to a lower end, and at the same time separating them, each from the rest;
- a conveyor comprising an endless conveyor belt having a longitudinal groove, and a drill bit receiving portion positioned at the lower end of the singulator, for receiving drill bits delivered by the singulator means into the groove, one at a time, and each spaced along the conveyor belt from the drill bit which precedes it;
- a gravity conveyor positioned to receive the drill bits in succession from said endless conveyor belt, said gravity conveyor including an elongated slideway groove into which the drill bits are received;
- identifying means for providing an identification signal for each drill bit, as to its type;
- an endless conveyor comprising a plurality of separate drill bit carriers, one for each drill bit, and a loading station positioned to receive drill bits from the gravity conveyor;
- a succession of dedicated receiving receptacles for the drill bits positioned alongside a portion of the path of travel of the endless conveyor; and
- control means, including a computer, stored information in the computer, and the identification signals generated for the drill bits, for removing each drill bit from its carrier and depositing it into the dedicated receiving receptacle for such type of drill bit, following movement of the carrier from the loading station to a position adjacent said dedicated receiving receptacle.

9. A system according to claim 8, wherein said gravity conveyor includes a rotatable section and means for stopping a drill bit when it is on the rotatable section, and said system includes a second identifying means upstream of the rotatable section which identifies the particular end-to-end orientation of each drill bit and produces a signal indicating such end-to-end orientation; and
- control means allowing movement of a drill bit which has a desired end-to-end orientation through the rotatable section of the gravity conveyor, and in response to said signal indicating that a particular drill bit has an improper end-to-end orientation, rotating the rotatable section 180° to reverse the end-to-end orientation of the drill bit, and then causing a continuation of the drill bit along the gravity conveyor.

10. A system according to claim 9, further comprising an infeed conveyor for initially conveying drill bits piled relatively high in a random orientation;
- a vibrating conveyor having a receiving receptacle positioned to receive drill bits from the infeed conveyor, and having a discharge end and means for vibrating the receiving receptacle for the purpose of at least partially untangling the drill bits while continuing to convey the drill bits; and
- advancing conveyor means for receiving drill bits from the receiving receptacle of the vibrating conveyor and delivering them onto the alignment conveyor.

11. A system according to claim 10, further comprising a demagnetizing means positioned in the path of the advancing conveyor means, said demagnetizing means serving to demagnetize the drill bits as they are conveyed from the vibrating conveyor to the alignment conveyor.

12. A system according to claim 8, wherein the dedicated receiving receptacles are positioned in a helical pattern developed about a vertical axis, and said endless conveyor includes means for guiding the drill bit carriers along a helical path which borders the helical pattern of the dedicated receiving receptacles.

13. A system for automated sorting of large quantities of many different types of drill bits, according to type, comprising:
- alignment means for aligning drill bits in a particular common direction;
- delivery conveyor means for delivering drill bits into the alignment means, in a random orientation;
- singulator means positioned to receive aligned drill bits from the alignment means and separate them from each other;
- singulated drill bit conveyor means positioned to receive singulated drill bits from the singulator and move them in series, each spaced apart from the drill bit which precedes it;

identifying means for identifying each drill bit and providing an identification signal, as to its type, as the drill bit moves past the identifying means;

an endless deposit conveyor comprising a plurality of separate drill bit carriers, one for each drill bit, and a loading station where each carrier receives a separate identified drill bit;

a succession of dedicated receiving receptacles for the drill bits positioned alongside a portion of the path of travel of the endless conveyor; and deposit means for removing each drill bit from its carrier and depositing it into the dedicated receiving receptacle for such drill bit, following movement of the carrier from the loading station to a position adjacent said dedicated receiving receptacle.

14. A system according to claim 13, wherein the singulated drill bit conveyor means extends perpendicular to the direction of movement of the drill bits in the singulator means, from a discharge end of the singulator means, and the alignment means extends substantially parallel to the singulated drill bit conveyor means and delivers aligned drill bits to a receiving end portion of the singulator means opposite the discharge end of the singulator means.

15. A system according to claim 14, wherein the delivery conveyor means for delivering drill bits into the alignment conveyor, in a random orientation, extends substantially perpendicular to the singulated drill bit conveyor means for singulated drill bits.

16. A system according to claim 13, wherein the endless deposit conveyor extends from the loading station substantially perpendicular to the singulated drill bit conveyor means to a helical path developed about a vertical axis, and extends from the helical path back to the loading station.

17. A system according to claim 13, wherein the singulated drill bit conveyor means comprises an elevating conveyor having a receiving end at a discharge end of the singulator means and an elevated discharge end, and a gravity conveyor having an upper receiving end adjacent the discharge end of the elevating conveyor and sloping downwardly therefrom to the loading station.

* * * * *